(12) United States Patent
Horade et al.

(10) Patent No.: US 11,192,384 B2
(45) Date of Patent: Dec. 7, 2021

(54) LIQUID CONSUMING SYSTEM AND DELIVERY SYSTEM

(71) Applicant: BROTHER KOGYO KABUSHIKI KAISHA, Nagoya (JP)

(72) Inventors: Kenta Horade, Toukai (JP); Sadaaki Miyazaki, Nagoya (JP); Jun Morikawa, Nagoya (JP); Hajime Inada, Nagoya (JP); Masafumi Miyazawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/226,996

(22) Filed: Dec. 20, 2018

(65) Prior Publication Data

US 2019/0193412 A1   Jun. 27, 2019

(30) Foreign Application Priority Data

Dec. 27, 2017   (JP) .............................. JP2017-252686

(51) Int. Cl.
  *B41J 2/175*   (2006.01)
  *B41J 29/393*  (2006.01)
  *G06Q 10/08*   (2012.01)

(52) U.S. Cl.
  CPC .......... *B41J 2/17566* (2013.01); *B41J 2/175* (2013.01); *B41J 2/1752* (2013.01); *B41J 2/1753* (2013.01);
  (Continued)

(58) Field of Classification Search
  CPC .................................................. B41J 2/17566
  See application file for complete search history.

(56) References Cited

U.S. PATENT DOCUMENTS 6,866,355 B2   3/2005   Aruga et al.
2002/0085050 A1   7/2002   Aruga et al.
(Continued)

FOREIGN PATENT DOCUMENTS

CN   105365395 A   3/2016
CN   105644154 A   6/2016
(Continued)

OTHER PUBLICATIONS

International Search Report and Written Opinion issued in related International Patent Application No. PCT/JP2018/047483, dated Mar. 27, 2019.

(Continued)

*Primary Examiner* — Julian D Huffman
(74) *Attorney, Agent, or Firm* — Merchant & Gould P.C.

(57) ABSTRACT

A liquid consuming system includes: an installation case configured to receive a cartridge having a first liquid chamber storing a liquid; a tank including a second liquid chamber; a flow path configured to communicate with the second liquid chamber and the first liquid chamber of the cartridge installed in the installation case; a head communicated with the second liquid chamber; a first communication interface; and a controller system configured to: determine a residual amount including at least an amount of liquid in the second liquid chamber of the tank; determine whether the determined residual amount reaches a predetermined amount; and based on determining that the determined residual amount reaches the predetermined amount, transmit first information through the first communication interface, the first information indicating an order instruction of the cartridge.

34 Claims, 21 Drawing Sheets

(52) U.S. Cl.
CPC ....... *B41J 2/17513* (2013.01); *B41J 2/17523* (2013.01); *B41J 2/17546* (2013.01); *B41J 2/17553* (2013.01); *B41J 29/393* (2013.01); *G06Q 10/087* (2013.01); *B41J 2002/17573* (2013.01); *B41J 2002/17576* (2013.01)

(56) References Cited

U.S. PATENT DOCUMENTS

| | | |
|---|---|---|
| 2009/0201351 A1 | 8/2009 | Shimizu et al. |
| 2013/0258008 A1 | 10/2013 | Kanbe et al. |
| 2015/0022597 A1 | 1/2015 | Kanbe |
| 2016/0009099 A1 | 1/2016 | Kanbe et al. |
| 2016/0059571 A1 | 3/2016 | Kobayashi |
| 2017/0061268 A1 | 3/2017 | Miyazawa |
| 2017/0297344 A1* | 10/2017 | Ibe .................... B41J 2/17566 |
| 2017/0345080 A1* | 11/2017 | Asai .................. H04N 1/00411 |
| 2019/0105908 A1 | 4/2019 | Ogawa et al. |
| 2019/0193412 A1 | 6/2019 | Horade et al. |

FOREIGN PATENT DOCUMENTS

| | | |
|---|---|---|
| DE | 102015203327 A1 | 8/2016 |
| EP | 2 990 208 A1 | 3/2016 |
| JP | 2003-15477 A | 1/2003 |
| JP | 2003015477 A | 1/2003 |
| JP | 2008-020536 A | 1/2008 |
| JP | 2008-238792 A | 10/2008 |
| JP | 2017-47537 A | 3/2017 |

OTHER PUBLICATIONS

Notice of Allowance issued in related U.S. Appl. No. 16/155,527, dated Aug. 14, 2019.
Chinese Office Action for Chinese Patent Application No. 201880083672.X dated Jan. 20, 2021, 25 pages (English translation included).
Chinese Office Action issued in corresponding Chinese Patent Application No. 201880083672.X, dated Jul. 23, 2021.
Office Action issued in related Japanese Application No. 2017-0252686, dated Oct. 19, 2021.

* cited by examiner

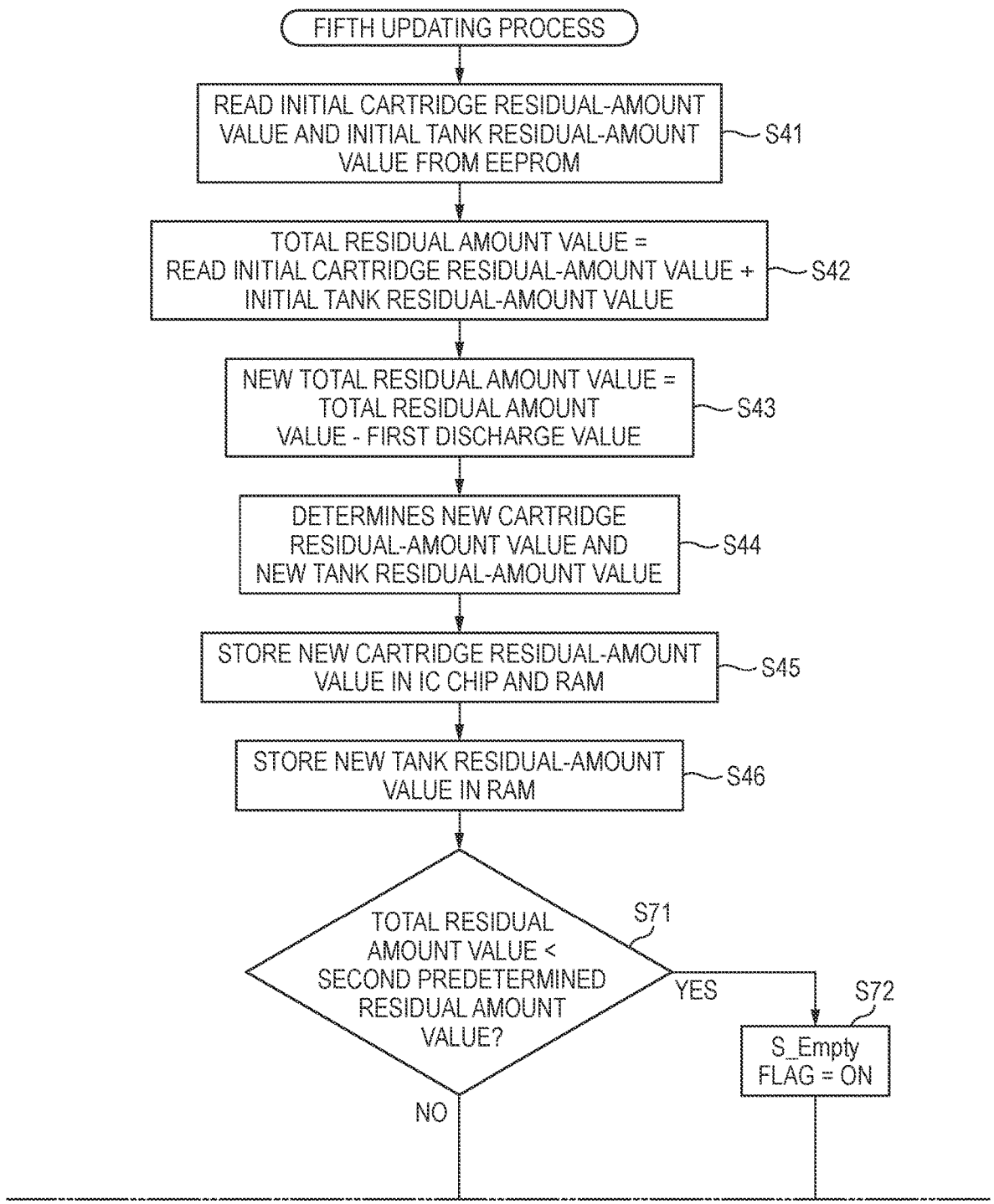
FIG. 11B1

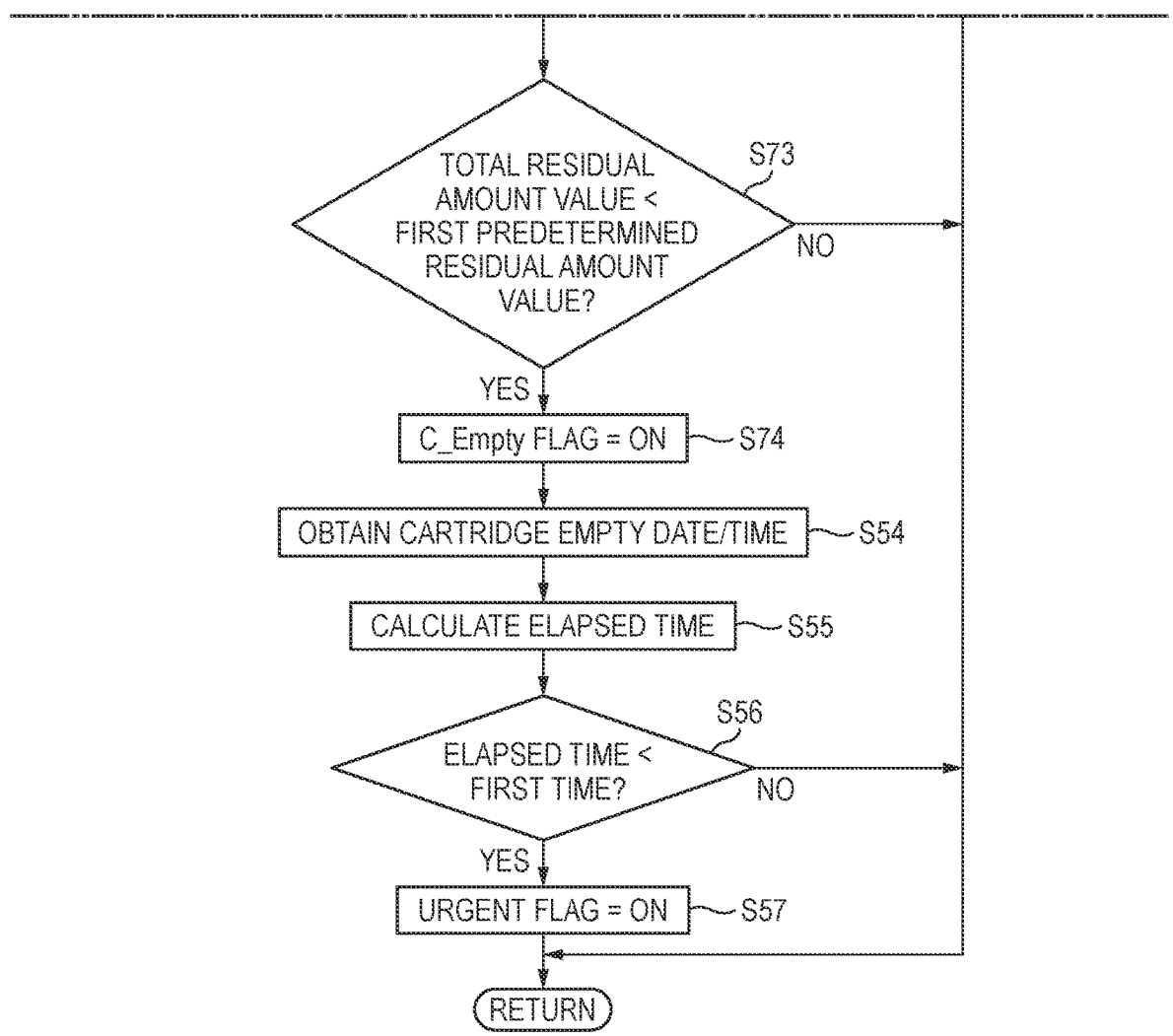
FIG. 11B2

LIQUID CONSUMING SYSTEM AND DELIVERY SYSTEM

CROSS-REFERENCE TO RELATED APPLICATION

This application claims priority from Japanese Patent Application No. 2017-252686 filed on Dec. 27, 2017, the entire subject-matter of which is incorporated herein by reference.

TECHNICAL FIELD

The disclosure relates a liquid consuming device, a liquid consuming system, and a delivery system which perform an order of a cartridge in which a liquid is stored.

BACKGROUND

There has been known a method, a control device, and a program for ordering a cartridge in which a liquid such as ink is stored. The cartridge is installed in a liquid consuming device such as a printer or a multifunction peripheral to supply a liquid to the liquid consuming device.

In the related-art ordering method, the residual-amount information which indicates the residual amount of the liquid in the cartridge is obtained to estimate a date when the liquid stored in the cartridge is used up. Next, a predetermined date on which the liquid remains in the cartridge is determined based on the estimated date. Further, a new cartridge is ordered on the determined predetermined date. Accordingly, the new cartridge is delivered to a user of the liquid consuming device until the liquid stored in the cartridge installed in the liquid consuming device is used up.

SUMMARY

Illustrative aspects of the disclosure provide a liquid consuming system including: an installation case configured to receive a cartridge having a first liquid chamber storing a liquid; a tank including a second liquid chamber; a flow path configured to communicate with the second liquid chamber and the first liquid chamber of the cartridge installed in the installation case; a head communicated with the second liquid chamber; a first communication interface; and a controller system configured to: determine a residual amount including at least an amount of liquid in the second liquid chamber of the tank; determine whether the determined residual amount reaches a predetermined amount; and based on determining that the determined residual amount reaches the predetermined amount, transmit first information through the first communication interface, the first information indicating an order instruction of the cartridge

BRIEF DESCRIPTION OF DRAWINGS

FIGS. 2A and 2B are external views of the printer, wherein FIG. 2A illustrates a state where a cover is in a covering position, and FIG. 2B illustrates a state where the cover is in an open position;

FIGS. 5A and 5B are diagrams illustrating a structure of a cartridge, wherein FIG. 5A is a front perspective view, and FIG. 5B is a longitudinal sectional view;

FIGS. 11B1 and 11B2 illustrate a flowchart of a fifth updating process according to the second illustrative embodiment;

DETAILED DESCRIPTION

In the above-explained related-art ordering method or the like, the residual-amount information which is a basis for determining the placement date of the order indicates the residual amount of the liquid in the cartridge installed in the liquid consuming device.

The disclosure provides a way for determining the date of ordering of a cartridge based on information including other than the residual amount of liquid in the cartridge.

An illustrative embodiment of the disclosure will be described below. It is noted that the illustrative embodiment described below is merely an example of the disclosure and can be appropriately modified without departing from the spirit of the disclosure. Further, execution orders of the following processes can be appropriately changed within the range of the disclosure.

First Illustrative Embodiment

Figure 1A:
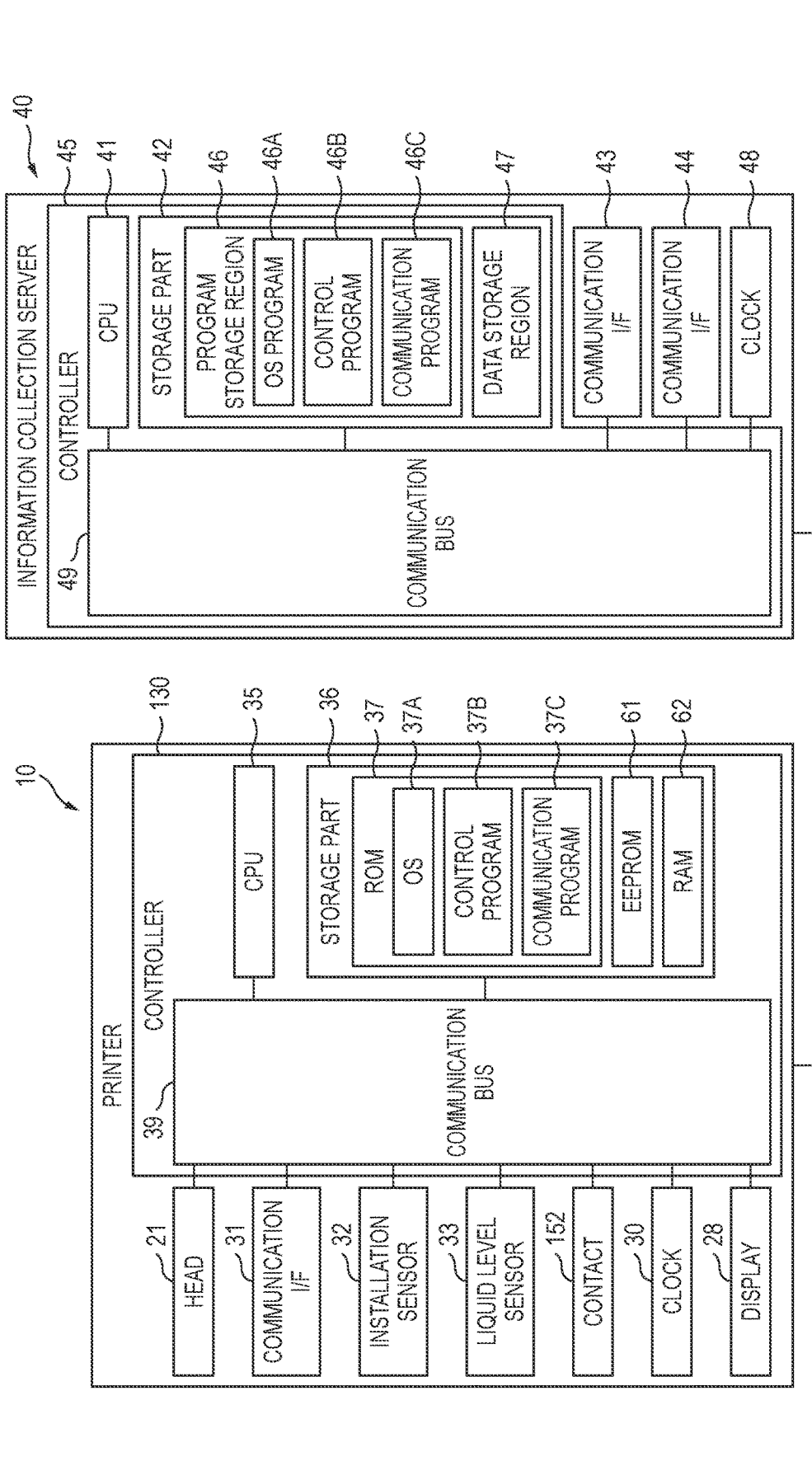
FIGS. 1A and 1B illustrate a configuration diagram of a delivery system according to a first illustrative embodiment.
Figure 1B:
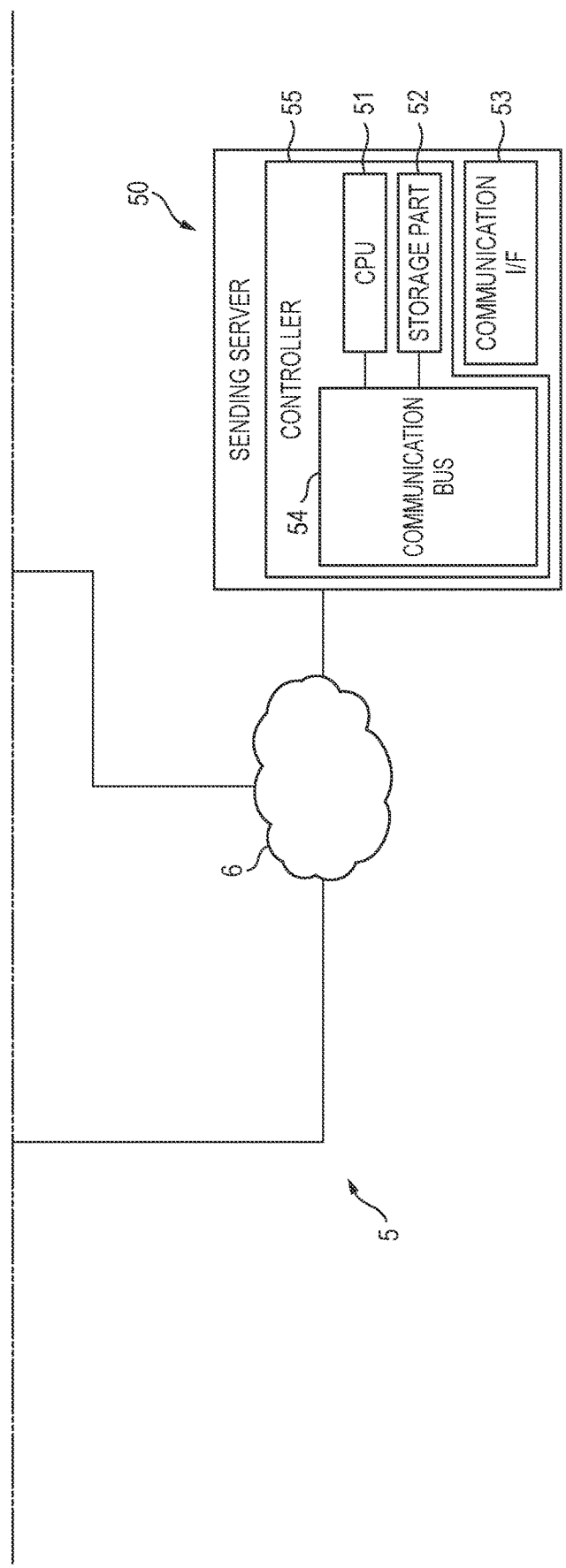

In the first illustrative embodiment, a delivery system 5 illustrated in FIGS. 1A and 1B is described. The delivery system 5 includes a printer 10 and an information collection server 40 which collects information from one or plural printers 10. The printer 10 and the information collection server 40 are connected by a communication line 6 such as the Internet. The printer 10 and the information collection server 40 can communicate with each other by using a communication protocol such as TCP/IP. In addition, the information collection server 40 can transmit information to a sending server 50 which receives an order through the communication line 6. The printer 10 and the information collection server 40 are examples of a liquid consuming system of the disclosure. The printer 10 is one example of a liquid consuming device. The information collection server 40 is one example of the information processing device. The sending system 5 is one example of a server.

(Outline of Printer)

Figure 2A:
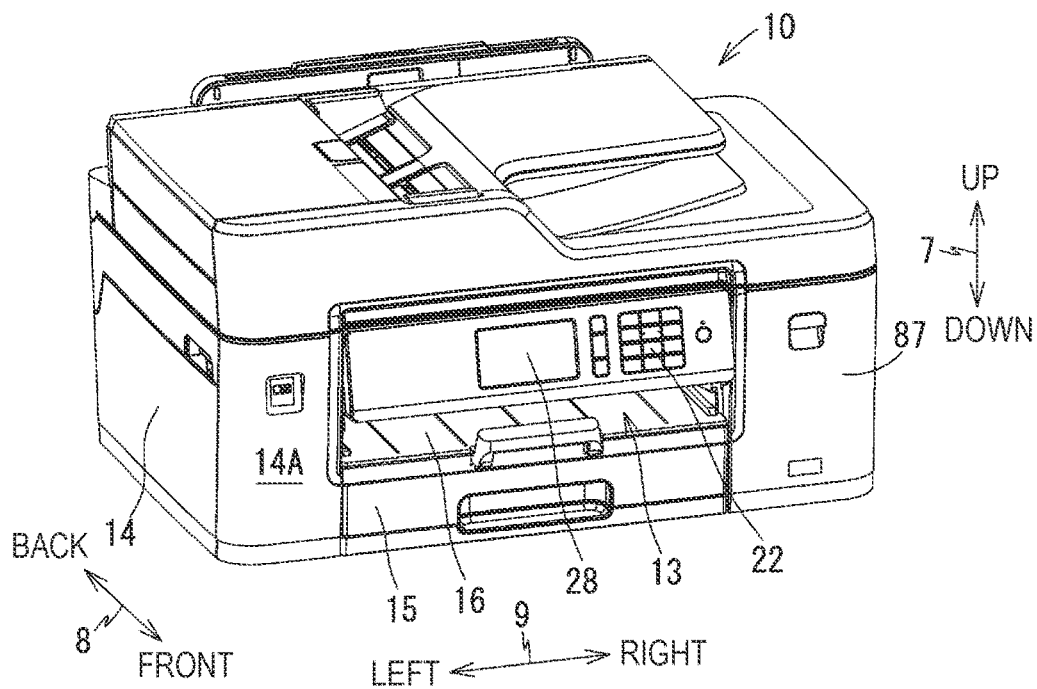
Figure 2B:
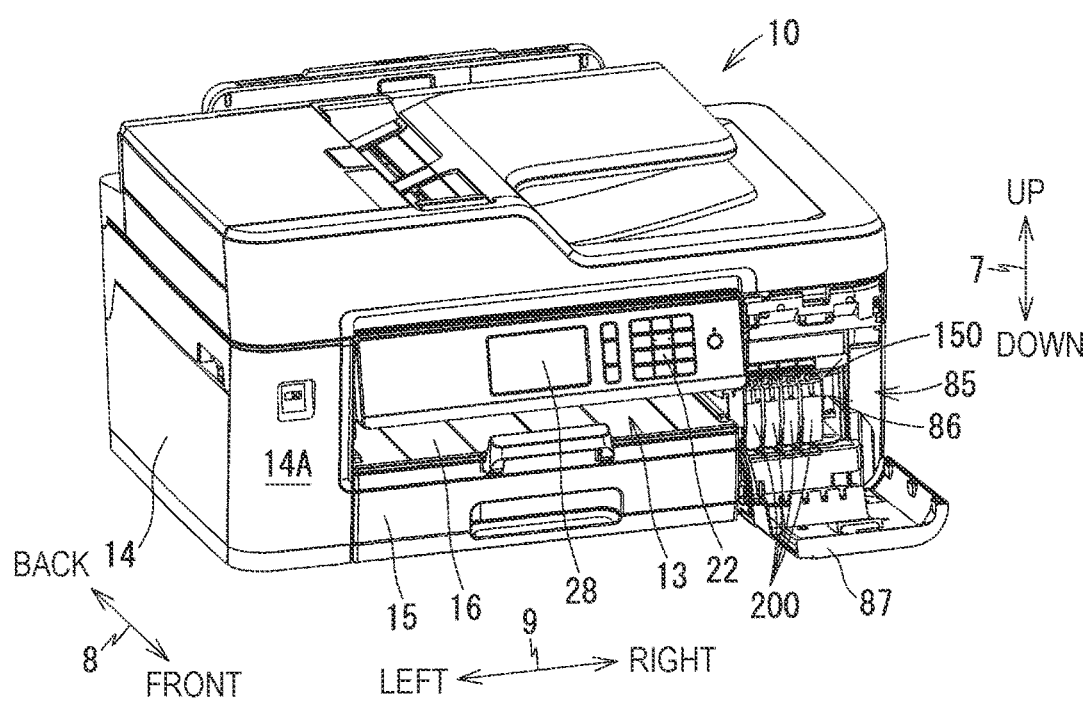

The printer 10 illustrated in FIGS. 2A and 2B is an inkjet printer which discharges ink droplets to print an image on a sheet. The printer 10 may be a multifunction peripheral having a facsimile function, a scan function, a copy function and the like.

Hereinafter, an up and down direction 7 is defined with reference to a use posture of the printer 10 installed in a horizontal plane in a usable manner, a front and back direction 8 is defined with a surface on which an opening 13 of the printer 10 is formed as a front surface, and a left and right direction 9 is defined when viewing the printer 10 from the front surface. That is, the up and down direction 7 in the use posture corresponds to a vertical direction, and the front and back direction 8 and the left and right direction 9 correspond to a horizontal direction. The front and back direction 8 and the left and right direction 9 are orthogonal to each other.

Figure 3:
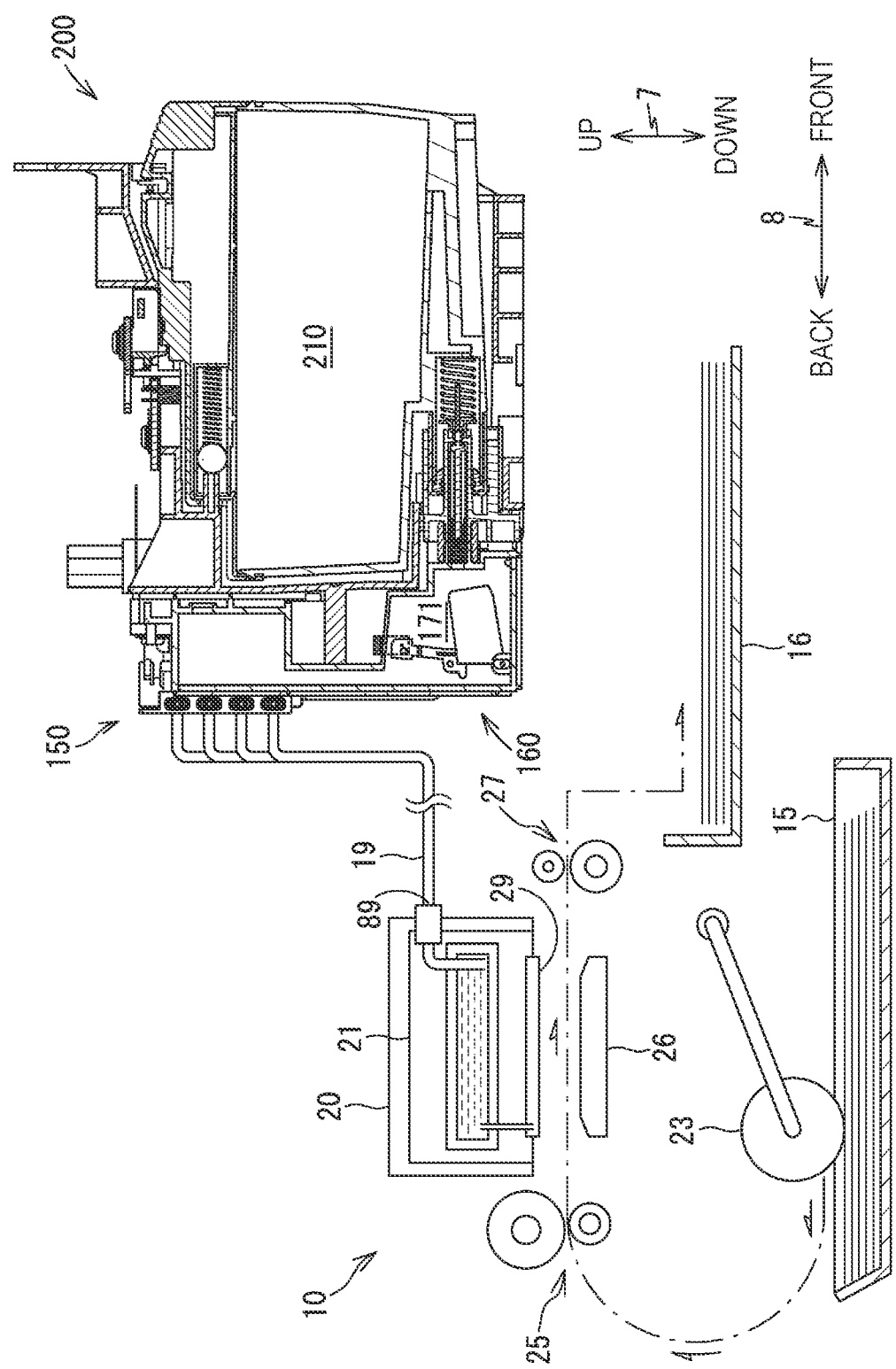
FIG. 3 is a schematic sectional view schematically illustrating an internal structure of the printer.
Figure 4:
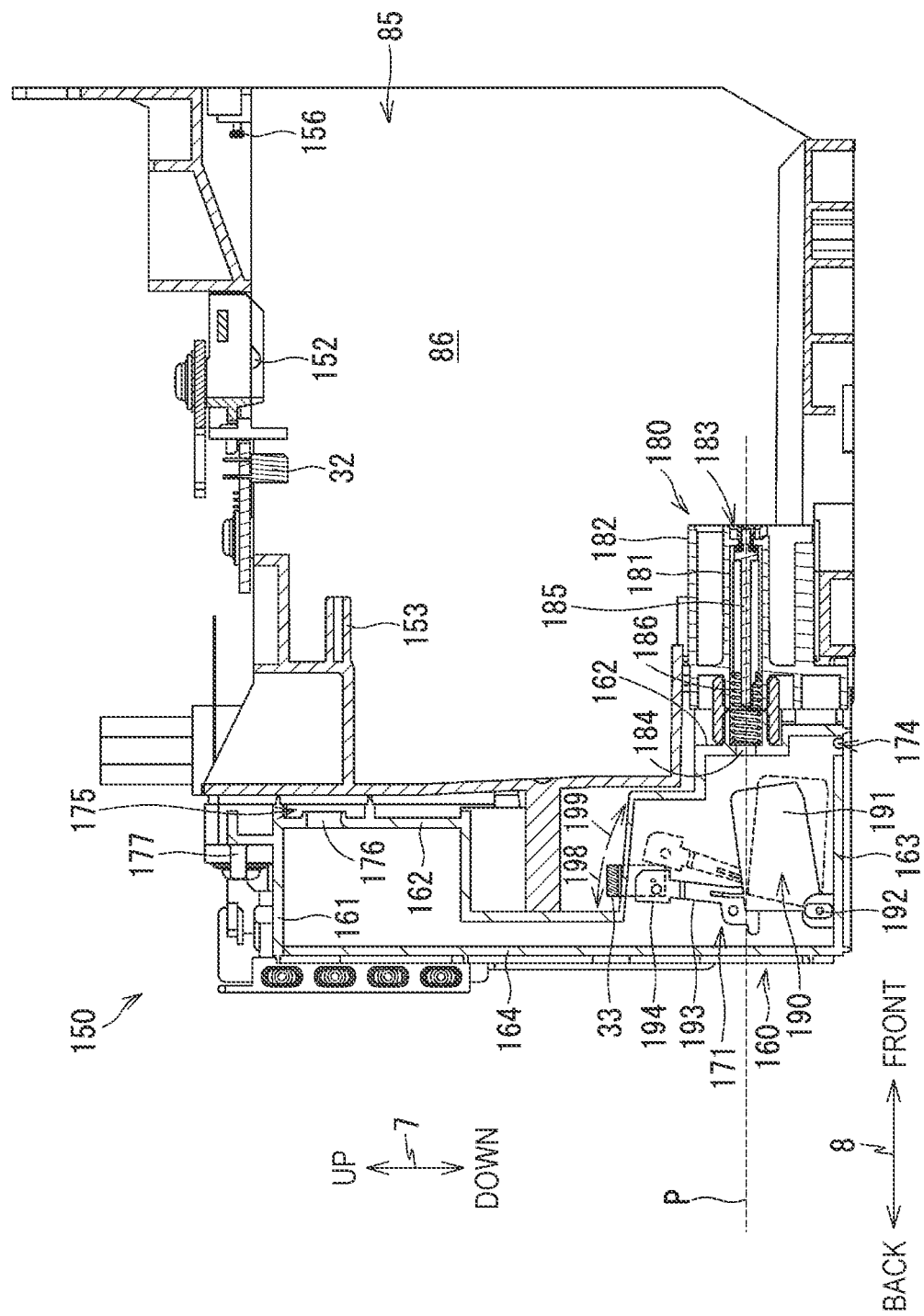
FIG. 4 is a longitudinal sectional view of an installation case.

The printer 10 includes a housing 14 having substantially a rectangular parallelepiped shape. Inside the housing 14, as illustrated in FIGS. 3 and 4, a feed tray 15, a feed roller 23, a conveyance roller 25, a head 21 having a plurality of nozzles 29, a platen 26, a discharge roller 27, a discharge tray 16, an installation case 150, and a tank 160 are located.

The printer 10 drives the feed roller 23 and the conveyance roller 25 to convey a sheet supported by the feed tray 15 to the position of the platen 26. Next, the printer 10 discharges ink, which is supplied from the tank 160 through a tube 19, to the head 21 through the nozzle 29. Accordingly, the ink is landed on the sheet supported by the platen 26, and an image is printed on the sheet. Then, the printer 10 drives the discharge roller 27 to discharge the sheet on which the image is printed to the discharge tray 16.

More specifically, the head 21 may be mounted on a carriage 20 that reciprocates along a main scanning direction (parallel to the left and right direction 9) intersecting with the sheet conveyance direction of the sheet by the conveyance roller 25. A driving force of a motor (not illustrated) is transmitted so that the carriage 20 moves along the main scanning direction (the direction perpendicular to the paper surface of FIG. 3). While the conveyance of the sheet by the conveyance roller 25 is stopped, the printer 10 discharges the ink to the head 21 through the nozzle 29 with moving the carriage 20 along the main scanning direction. Accordingly, an image is printed on a partial area of the sheet (hereinafter, referred to as "one pass") facing the head 21. Next, the printer 10 causes the conveyance roller 25 to convey the sheet so that a next image printing area of the sheet faces the head 21. Then, these processes are alternately and repeatedly executed, and thus an image is printed on one sheet.

(Display)

A housing 14 includes a display 28. The display 28 is located in the front surface of the housing 14. The display 28 is a so-called touch panel in which a touch sensor is arranged on a display panel. However, instead of the display 28 or together with the display 28, the display panel and a push button may be located in the front surface of the housing 14. The display 28 receives an input from a user.

(Cover)

As illustrated in FIGS. 2A and 2B, an opening 85 is formed at a right end in the left and right direction 9 on a front surface 14A of the housing 14. The housing 14 further includes a cover 87. The cover 87 is rotatable between a covering position (a position illustrated in FIG. 3A) at which the opening 85 is covered and an open position (a position illustrated in FIG. 3B) at which the opening 85 is exposed. The cover 87 is supported by the housing 14 so as to be rotatable around a rotation axis along the left and right direction 9 in the vicinity of a lower end of the housing 14 in the up and down direction 7, for example. Then, an installation case 150 in which a cartridge 200 is installed is located in an accommodating space 86 which is provided inside the housing 14 and spreads backwards from the opening 85.

(Installation Case)

As illustrated in FIG. 4, the installation case 150 includes a contact 152, a rod 153, an installation sensor 32, a liquid level sensor 33, and a lock pin 156. The installation case 150 can accommodate four cartridges 200 corresponding to respective colors of black, cyan, magenta, and yellow. That is, the installation case 150 includes four contacts 152, four rods 153, four installation sensors 32, and four liquid level sensors 33 corresponding to four cartridges 200. The number of the cartridges 200 which can be accommodated in the installation case 150 is not limited to four, and one cartridge or five or more cartridges may be accommodated.

The installation case 150 has a box shape having an internal space in which the installed cartridge 200 is accommodated. The internal space of the installation case 150 is defined by a top wall defining an upper end, a bottom wall defining a lower end, an inner wall defining a rear end in the front and back direction 8, and a pair of sidewalls defining both ends in the left and right direction 9. On the other hand, the opening 85 is located to face the inner wall of the installation case 150. That is, the opening 85 exposes the inner space of the installation case 150 to the outside of the printer 10 when the cover 87 is disposed at the open position.

Then, the cartridge 200 is installed in the installation case 150 through the opening 85 of the housing 14, and is pulled out of the installation case 150. More specifically, the cartridge 200 passes backwards through the opening 85 in the front and back direction 8, and is installed in the installation case 150. The cartridge 200 pulled out of the installation case 150 passes forward through the opening 85 in the front and back direction 8.

(Contact)

The contact 152 is located on the top wall of the installation case 150. The contact 152 protrudes downwardly toward the internal space of the installation case 150 from the top wall. The contact 152 is located so as to be in contact with an electrode 248 (to be described below) of the cartridge 200 in a state where the cartridge 200 is installed in the installation case 150. The contact 152 has conductivity and is elastically deformable along the up and down direction 7. The contact 152 is electrically connected to a controller 130.

(Rod)

The rod 153 protrudes forward from the inner wall of the installation case 150. The rod 153 is located above a joint 180 (to be described below) on the inner wall of the installation case 150. The rod 153 enters an air valve chamber 214 through an air communication port 221 (to be described below) of the cartridge 200 in the course of installing the cartridge 200 on the installation case 150. When the rod 153 enters the air valve chamber 214, the air valve chamber 214 (to be described below) communicates with the air.

(Installation Sensor)

The installation sensor 32 is located on the top wall of the installation case 150. The installation sensor 32 is a sensor for detecting whether the cartridge 200 is installed in the installation case 150. The installation sensor 32 includes a light emitting portion and a light receiving portion which are separated from each other in the left and right direction 9. In a state where the cartridge 200 is installed in the installation case 150, a light shielding rib 245 (to be described below) of the cartridge 200 is located between the light emitting portion and the light receiving portion of the installation sensor 32. In other words, the light emitting portion and the light receiving portion of the installation sensor 32 are located opposite to each other across the light shielding rib 245 of the cartridge 200 installed in the installation case 150.

The installation sensor 32 outputs a different signal (hereinafter referred to as "installation signal") depending on whether the light irradiated along the left and right direction 9 from the light emitting portion is received by the light receiving portion. The installation sensor 32 outputs a low-level signal to the controller 130 when an intensity of the light received by the light receiving portion is lower than threshold intensity, for example. Meanwhile, the installation sensor 32 outputs a high-level signal having higher signal intensity than the low-level signal to the controller 130 when the intensity of the light received by the light receiving portion is equal to or higher than the threshold intensity.

(Liquid Level Sensor)

The liquid level sensor 33 is a sensor for detecting whether a detection target portion 194 of an actuator 190 (to be described below) is located at a detection position. The liquid level sensor 33 includes a light emitting portion and a light receiving portion which are separated from each other in the left and right direction 9. In other words, when the detection target portion 194 is located at the detection position, the detection target portion 194 is located between the light emitting portion and the light receiving portion of the liquid level sensor 33. On the other hand, when the detection target portion 194 is not located at the detection position, the detection target portion 194 is located between the light emitting portion and the light receiving portion of the liquid level sensor 33. The liquid level sensor 33 outputs a different signal depending on whether the light output from the light emitting portion is received by the light receiving portion. The liquid level sensor 33 outputs a low-level signal to the controller 130 when the intensity of the light received by the light receiving portion is lower than the threshold intensity, for example. Meanwhile, the liquid level sensor 33 outputs a high-level signal having higher signal intensity than the low-level signal to the controller 130 when the intensity of the light received by the light receiving portion is equal to or higher than the threshold intensity.

(Lock Pin)

The lock pin 156 is a rod-like member extending along the left and right direction 9 at the upper end of the internal space of the installation case 150 and in the vicinity of the opening 85. Both ends of the lock pin 156 in the left and right direction 9 are fixed to the pair of sidewalls of the installation case 150. The lock pin 156 extends in the left and right direction 9 across four spaces in which four cartridges 200 can be accommodated. The lock pin 156 is used to hold the cartridge 200 installed in the installation case 150 at an installation position illustrated in FIG. 6. The cartridge 200 is fixed to the lock pin 156 in the state of being installed in the installation case 150.

(Tank)

The printer 10 includes four tanks 160 corresponding to four cartridges 200. Specifically, the printer 10 includes a tank 160 in which a magenta ink is stored in correspondence to the cartridge 200 in which a magenta ink is stored, a tank 160 in which a cyan ink is stored in correspondence to the cartridge 200 in which a cyan ink is stored, a tank 160 in which a yellow ink is stored in correspondence to the cartridge 200 in which a yellow ink is stored, and a tank 160 in which a black ink is stored in correspondence to the cartridge 200 in which a black ink is stored. Four tanks 160 have substantially the common configuration, and one tank 160 will be described.

The tank 160 is located backwards from the inner wall of the installation case 150. As illustrated in FIG. 4, the tank 160 includes an upper wall 161, a front wall 162, a lower wall 163, a rear wall 164, and a pair of sidewalls (not illustrated). The front wall 162 includes a plurality of walls which deviate from each other in the front and back direction 8. A liquid chamber 171 is formed inside the tank 160. The liquid chamber 171 is an example of a second liquid chamber.

Among the walls forming the tank 160, at least the wall facing the liquid level sensor 33 has translucency. Thus, the light output from the liquid level sensor 33 can penetrate through the wall facing the liquid level sensor 33. At least a part of the rear wall 164 may be formed of a film welded to end faces of the upper wall 161, the lower wall 163, and the sidewall. In addition, the sidewall of the tank 160 may be common to the installation case 150 or may be independent of the installation case 150. Moreover, the tanks 160 adjacent to each other in the left and right direction 9 are partitioned by a partition wall (not illustrated).

The liquid chamber 171 communicates with an ink flow path (not illustrated) through an outflow port 174. A lower end of the outflow port 174 is defined by the lower wall 163 defining the lower end of the liquid chamber 171. The outflow port 174 is located below the joint 180 (more specifically, a lower end of a through hole 184). The ink flow path (not illustrated) communicating with the outflow port 174 communicates with the tube 19. Thus, the liquid chamber 171 communicates with the head 21 from the outflow port 174 through the ink flow path and the tube 19. That is, the ink stored in the liquid chamber 171 is supplied from the outflow port 174 to the head 21 through the ink flow path and the tube 19. In the ink flow path and the tube 19 communicating with the outflow port 174, one end (outflow port 174) communicates with the liquid chamber 171, and the other end 89 (see FIG. 3) communicates with the head 21.

The liquid chamber 171 communicates with the air through an air communication chamber 175. More specifically, the air communication chamber 175 communicates with the liquid chamber 171 through the through hole 176 penetrating the front wall 162. In addition, the air communication chamber 175 communicates with the outside of the printer 10 through an air communication port 177 and a tube (not illustrated) connected to the air communication port 177. That is, in the air communication chamber 175, one end (through hole 176) communicates with the liquid chamber 171 and the other end (air communication port 177) communicates with the outside of the printer 10. The air communication chamber 175 communicates with the air through the air communication port 177 and the tube (not illustrated).

(Joint)

As illustrated in FIG. 4, the joint 180 includes a needle 181 and a guide 182. The needle 181 is a tube in which a flow path is formed. The needle 181 protrudes forward from the front wall 162 defining the liquid chamber 171. An opening 183 is formed at a tip of the needle 181. In addition, the internal space of the needle 181 communicates with the liquid chamber 171 through the through hole 184 penetrating the front wall 162. In the needle 181, one end (opening 183) communicates with the outside of the tank 160, and the other end (through hole 184) communicates with the liquid chamber 171. The guide 182 is a cylindrical member disposed around the needle 181. The guide 182 protrudes forward from the front wall 162. A front end of the guide 182 is opened.

In the internal space of the needle 181, a valve 185 and a coil spring 186 are located. In the internal space of the needle 181, the valve 185 is movable between a closed position and an open position in the front and back direction 8. The valve 185 closes the opening 183 when being located at the closed position. Further, the valve 185 opens the opening 183 when being located at the open position. The coil spring 186 urges the valve 185 in a moving direction from the open position to the closed position, that is, forward in the front and back direction 8. The internal space of the needle 181 is one example of the flow path.

(Actuator)

As illustrated in FIG. 4, the actuator 190 is located in the liquid chamber 171. The actuator 190 is supported by a support member (not illustrated) disposed in the liquid chamber 171 so as to be rotatable in directions of arrows 198 and 199. The actuator 190 is rotatable between a position indicated by a solid line in FIG. 4 and a position indicated by a broken line. Further, the actuator 190 is prevented from rotating in the direction of the arrow 198 from the position of the solid line by a stopper (not illustrated; for example, an inner wall of the liquid chamber 171). The actuator 190 includes a float 191, a shaft 192, an arm 193, and a detection target portion 194. The actuator 190 is one example of a detection object.

The float 191 is formed of a material having a smaller specific gravity than the ink stored in the liquid chamber 171. The shaft 192 protrudes in the left and right direction 9 from right and left sides of the float 191. The shaft 192 is inserted into a hole (not illustrated) formed in the support member. Thus, the actuator 190 is supported by the support member so as to be rotatable around the shaft 192. The arm 193 extends substantially upwardly from the float 191. The detection target portion 194 is located at a tip of the arm 193. That is, the arm 193 is located between the detection target portion 194 and the shaft 192. The detection target portion 194 is a plate-like member extending in the up and down direction 7 and the front and back direction 8, respectively. The detection target portion 194 is formed of a material or color that shields the light output from the light emitting portion of the liquid level sensor 33.

When a liquid level of the ink stored in the liquid chamber 171 is equal to or higher than a reference position P, the actuator 190 rotated in the direction of the arrow 198 by buoyancy is held at the detection position indicated by the solid line in FIG. 4 by the stopper. On the other hand, when the liquid level of the ink is lower than the reference position P, the actuator 190 rotates in the direction of the arrow 199 as the liquid level lowers. Thus, the detection target portion 194 of the actuator 190 moves to a position out of the detection position. The detection target portion 194 is a portion of the actuator 190, and thus the detection target portion 194 moves to a position corresponding to the amount of ink stored in the liquid chamber 171.

The reference position P has the same height as an axial center of the needle 181 in the up and down direction 7, and has the same height as a center of an ink supply port 234 (to be described below). However, the reference position P is not limited to the position as long as it is located above the outflow port 174 in the up and down direction 7. As another example, the reference position P may have a height of the upper end or the lower end of the internal space of the needle 181, or may have a height of an upper end or a lower end of the ink supply port 234.

When the liquid level of the ink stored in the liquid chamber 171 is equal to or higher than the reference position P, the light output from the light emitting portion of the liquid level sensor 33 is blocked by the detection target portion 194 located at the detection position. Thus, since the light output from the light emitting portion does not reach the light receiving portion, the liquid level sensor 33 outputs a low-level signal to the controller 130. On the other hand, when the liquid level of the ink stored in the liquid chamber 171 is lower than the reference position P, since the light output from the light emitting portion reaches the light receiving portion, the liquid level sensor 33 outputs a high-level signal to the controller 130. That is, the controller 130 can detect from the signal output from the liquid level sensor 33 whether the liquid level of the ink stored in the liquid chamber 171 is equal to or higher than the reference position P. The reference position P is one example of a predetermined position. A low-level signal "L" is one example of a first signal, and a high-level signal "H" is one example of a second signal. Hereinafter, the low-level signal may be described as "L", and the high-level signal is described as "H" in some cases.

(Cartridge)

The cartridge 200 is a container including a liquid chamber 210 (see FIG. 3) which stores ink, which is a liquid, therein. The liquid chamber 210 is one example of a first liquid chamber.

Figure 5A:
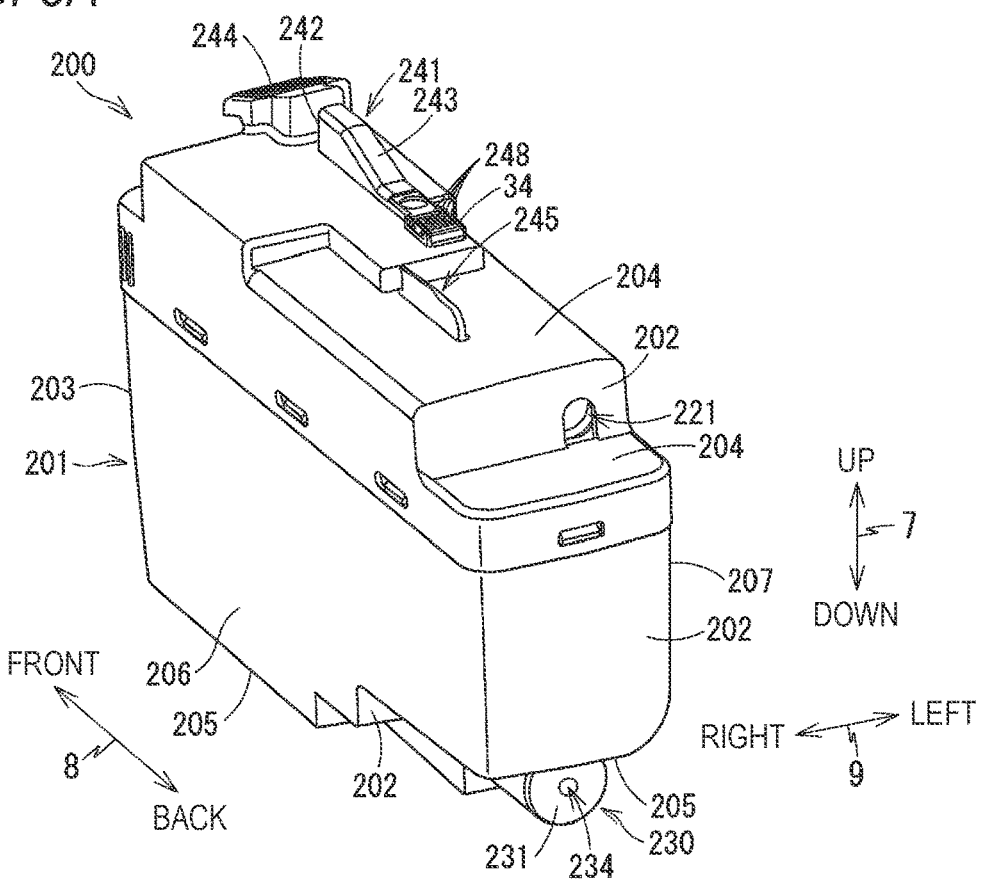

The liquid chamber 210 is defined by a resin wall, for example. As illustrated in FIG. 5A, the cartridge 200 has a flat shape in which dimensions in the up and down direction 7 and the front and back direction 8 are larger than a dimension in the left and right direction 9. The cartridges 200 capable of storing inks of other colors may have the same outer shape or different outer shapes. At least a part of the walls forming the cartridge 200 has translucency. Thus, a user can visually recognize the liquid level of the ink, which is stored in the liquid chamber 210 of the cartridge 200, from the outside of the cartridge 200.

The cartridge 200 includes a housing 201 and a supply tube 230. The housing 201 is formed with a rear wall 202, a front wall 203, an upper wall 204, a lower wall 205, and a pair of sidewalls 206 and 207. The rear wall 202 includes a plurality of walls that deviate from each other in the front and back direction 8. In addition, the upper wall 204 includes a plurality of walls that deviate from each other in the up and down direction 7. Further, the lower wall 205 includes a plurality of walls that deviate from each other in the up and down direction 7.

Figure 5B:
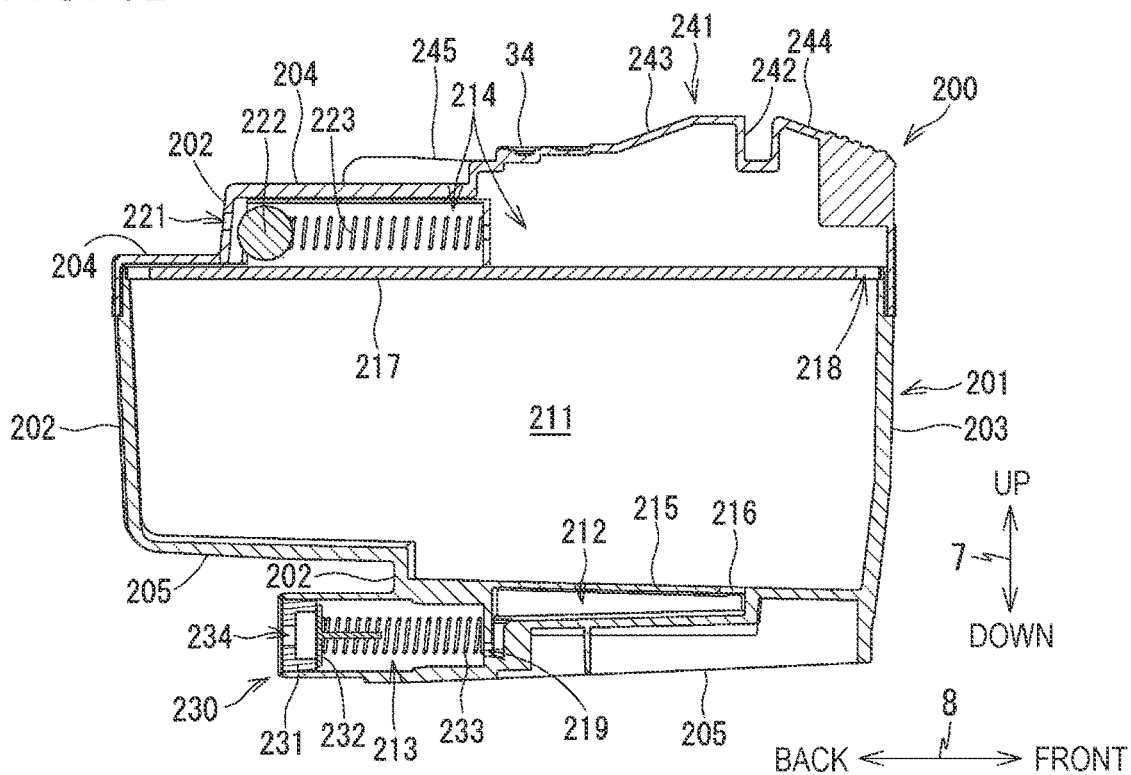

In the internal space of the cartridge 200, as illustrated in FIG. 5B, the liquid chamber 210, an ink valve chamber 213, and the air valve chamber 214 are formed. The liquid chamber 210 includes an upper liquid chamber 211 and a lower liquid chamber 212. The upper liquid chamber 211, the lower liquid chamber 212, and the air valve chamber 214 are internal spaces of the housing 201. On the other hand, the ink valve chamber 213 is an internal space of the supply tube 230. The liquid chamber 210 stores ink. The air valve chamber 214 allows the liquid chamber 210 and the outside of the cartridge 200 to communicate with each other.

The upper liquid chamber 211 and the lower liquid chamber 212 of the liquid chamber 210 are separated from each other in the up and down direction 7 by a partition wall 215 that partitions the internal space of the housing 201. Then, the upper liquid chamber 211 and the lower liquid chamber 212 communicate with each other through a through hole 216 formed in the partition wall 215. In addition, the upper liquid chamber 211 and the air valve chamber 214 are separated from each other by a partition wall 217 that partitions the internal space of the housing 201. Then, the upper liquid chamber 211 and the air valve chamber 214 communicate with each other through a through hole 218 formed in the partition wall 217. Further, the ink valve chamber 213 communicates with a lower end of the lower liquid chamber 212 through a through hole 219.

The air valve chamber 214 communicates with the outside of the cartridge 200 through the air communication port 221 formed in the rear wall 202 at the upper part of the cartridge 200. That is, in the air valve chamber 214, one end (through hole 218) communicates with the liquid chamber 210 (more specifically, the upper liquid chamber 211), and the other end (air communication port 221) communicates with the outside of the cartridge 200. The air valve chamber 214 communicates with the air through the air communication port 221. In addition, a valve 222 and a coil spring 223 are located in the air valve chamber 214. The valve 222 is movable between a closed position and an open position in the front and back direction 8. When being located at the closed position, the valve 222 closes the air communication port 221. Further, when being located at the open position, the valve 222 opens the air communication port 221. The coil spring 223 urges the valve 222 in a moving direction from the open position to the closed position, that is, backward in the front and back direction 8.

The rod 153 enters the air valve chamber 214 through the air communication port 221 in the course of installing the cartridge 200 on the installation case 150. The rod 153 having entered the air valve chamber 214 moves the valve 222 located at the closed position against an urging force of the coil spring 223 forward in the front and back direction 8. Then, as the valve 222 moves to the open position, the upper liquid chamber 211 communicates with the air. The configuration for opening the air communication port 221 is not limited to the above example. As another example, a configuration may be adopted in which the rod 153 breaks through a film that seals the air communication port 221.

The supply tube 230 protrudes in the lower part of the housing 201 from the rear wall 202 backward in the front and back direction 8. The rear end of the supply tube 230 is opened. That is, the ink valve chamber 213 allows the liquid chamber 210 communicating through the through hole 219 and the outside of the cartridge 200 to communicate with each other. In the ink valve chamber 213, one end (through hole 219) communicates with the liquid chamber 210 (more specifically, the lower liquid chamber 212), and the other end (ink supply port 234 (to be described below)) communicates with the outside of the cartridge 200. In addition, in the ink valve chamber 213, a packing 231, a valve 232, and a coil spring 233 are located.

At the center of the packing 231, the ink supply port 234 penetrating in the front and back direction 8 is formed. An inner diameter of the ink supply port 234 is slightly smaller than an outer diameter of the needle 181. The valve 232 is movable between a closed position and an open position in the front and back direction 8. When being located at the closed position, the valve 232 comes in contact with the packing 231 and closes the ink supply port 234. Further, when being located at the open position, the valve 232 separates from the packing 231 and opens the ink supply port 234. The coil spring 233 urges the valve 232 in a moving direction from the open position to the closed position, that is, backward in the front and back direction 8. In addition, the urging force of the coil spring 233 is larger than that of the coil spring 186.

The supply tube 230 enters the guide 182 in the course of installing the cartridge 200 on the installation case 150, and the needle 181 eventually enters the ink valve chamber 213 through the ink supply port 234. At this time, the needle 181 makes liquid-tight contact with the inner peripheral surface defining the ink supply port 234 while elastically deforming the packing 231. When the cartridge 200 is further inserted into the installation case 150, the needle 181 moves forward the valve 232 against an urging force of the coil spring 233. In addition, the valve 232 moves backward the valve 185 protruding from the opening 183 of the needle 181 against the urging force of the coil spring 186.

Figure 6:
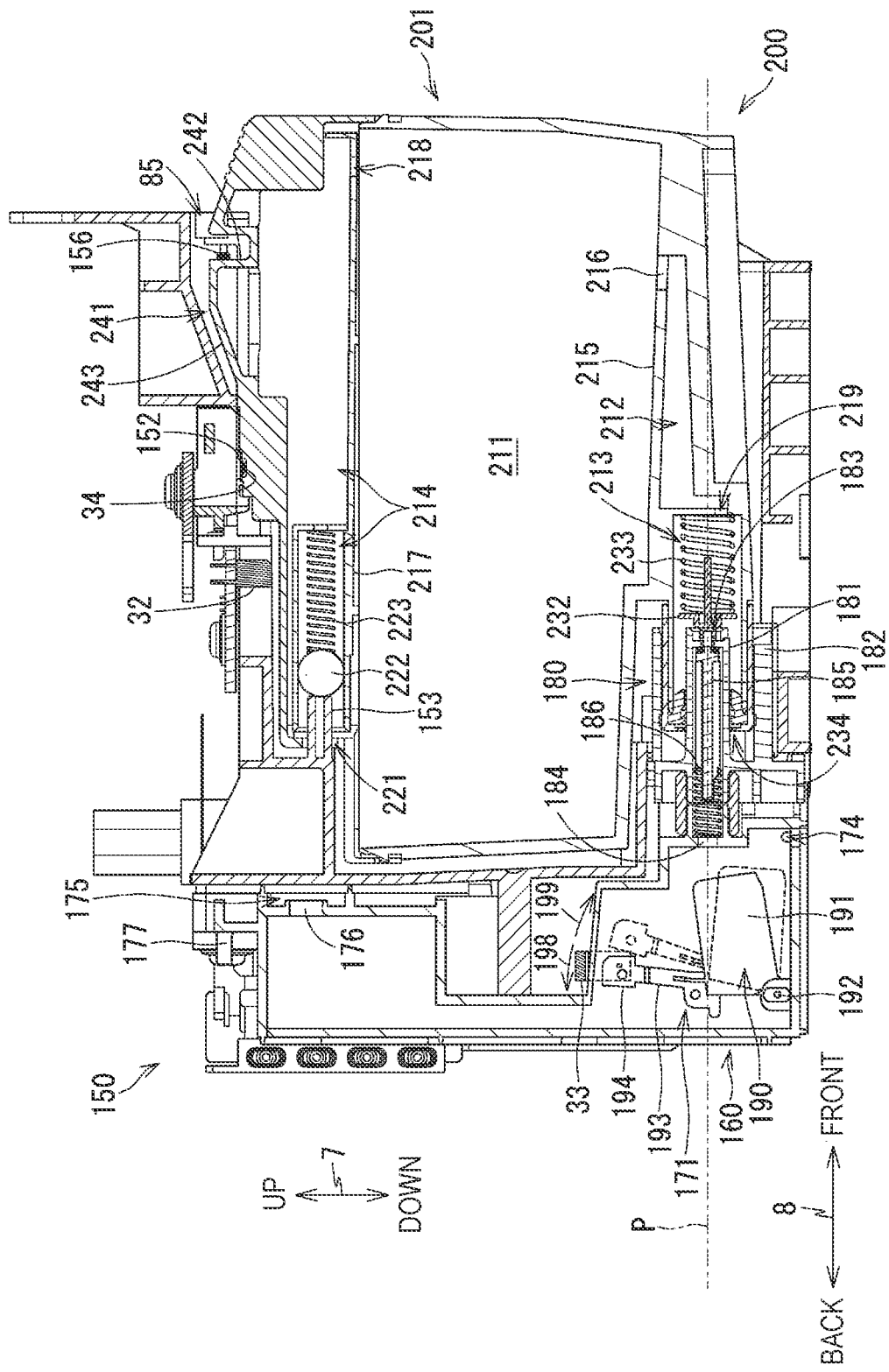
FIG. 6 is a longitudinal sectional view illustrating a state where the cartridge is installed in the installation case.

Thus, as illustrated in FIG. 6, the ink supply port 234 and the opening 183 are opened, and the ink valve chamber 213 of the supply tube 230 communicates with the internal space of the needle 181.

In a state where the cartridge 200 is installed in the installation case 150, a part of the liquid chamber 210 and a part of the liquid chamber 171 overlap each other when viewed in the horizontal direction. Further, the bottom part of the liquid chamber 171 is located below the bottom part of the liquid chamber 210. As a result, the ink stored in the liquid chamber 210 moves to the liquid chamber 171 of the tank 160 due to a difference between the water head of the ink stored in the liquid chamber 210 and the water head of the liquid chamber 171 through the supply tube 230 and the joint 180 which are connected.

As illustrated in FIGS. 5A and 5B, a projection 241 is formed on the upper wall 204. The projection 241 protrudes upward from the outer surface of the upper wall 204 and extends in the front and back direction 8. The projection 241 includes a lock surface 242 and an inclined surface 243. The lock surface 242 and the inclined surface 243 are located above the upper wall 204. The lock surface 242 is directed to the front side in the front and back direction 8 and extends in the up and down direction 7 and the left and right direction 9, respectively (that is, being substantially orthogonal to the upper wall 204). The inclined surface 243 is inclined with respect to the upper wall 204 so as to be directed upward and backward.

The lock surface 242 is a surface to be brought into contact with the lock pin 156 in a state where the cartridge 200 is installed in the installation case 150. The inclined surface 243 is a surface for guiding the lock pin 156 to a position where the lock pin comes in contact with the lock surface 242 in the course of installing the cartridge 200 on the installation case 150. In a state where the lock surface 242 and the lock pin 156 are in contact with each other, the cartridge 200 is held at the installation position illustrated in FIG. 6 against the urging force of the coil springs 186, 223, and 233.

A flat plate-like member is formed in front of the lock surface 242 so as to extend upward from the upper wall 204. An upper surface of the flat plate-like member corresponds to an operation portion 244 to be operated by a user when the cartridge 200 is removed from the installation case 150. When the cartridge 200 is installed in the installation case 150, and the cover 87 is located at the open position, the operation portion 244 can be operated by the user. When the operation portion 244 is pushed downward, the cartridge 200 rotates, and thus the lock surface 242 moves downward from the lock pin 156. As a result, the cartridge 200 can be removed from the installation case 150.

As illustrated in FIGS. 5A and 5B, the light shielding rib 245 is formed on the outer surface of the upper wall 204 and behind the projection 241. The light shielding rib 245 protrudes upward from the outer surface of the upper wall 204 and extends in the front and back direction 8. The light shielding rib 245 is formed of a material or color that shields the light output from the light emitting portion of the installation sensor 32. The light shielding rib 245 is located on an optical path extending from the light emitting portion to the light receiving portion of the installation sensor 32 in a state where the cartridge 200 is installed in the installation case 150. That is, the installation sensor 32 outputs a low-level signal to the controller 130 (FIGS. 1A and 1B) when the cartridge 200 is installed in the installation case 150. On the other hand, the installation sensor 32 outputs a high-level signal to the controller 130 when the cartridge 200 is not installed in the installation case 150. That is, the controller 130 can detect whether the cartridge 200 is installed in the installation case 150, depending on a signal output from the installation sensor 32.

As illustrated in FIGS. 5A and 5B, an IC chip 34 is located on the outer surface of the upper wall 204 and between the light shielding rib 245 and the projection 241 in the front and back direction 8. On the IC chip 34, an electrode 248 is formed. In addition, the IC chip 34 includes a memory (not illustrated). The electrode 248 is electrically connected to the memory of the IC chip 34. The electrode 248 is exposed on an upper surface of the IC chip 34 so as to be electrically connectable with the contact 152. That is, the electrode 248 is electrically connected to the contact 152 in a state where the cartridge 200 is installed in the installation case 150. The controller 130 can read information from the memory of the IC chip 34 through the contact 152 and the electrode 248, and can write information to the memory of the IC chip 34 through the contact 152 and the electrode 248.

The memory of the IC chip 34 stores identification information, a serial number, and a cartridge residual-amount value of the cartridge 200. The identification information is information that indicates whether the cartridge 200 is a small-volume cartridge or a large-volume cartridge, the color of the stored ink, and the like. The serial number is information for identifying the individual of the cartridge 200. The cartridge residual-amount value is a value that indicates the amount of the ink stored in the cartridge 200. The cartridge residual-amount value in the unused cartridge 200 is stored in the memory as an initial residual amount value indicating an initial residual ink amount.

(Controller)

The printer 10 includes the controller 130. As illustrated in FIGS. 1A and 1B, the controller 130 includes a CPU 35, a storage part 36, and a communication bus 39. The storage part 36 includes an ROM 37, an EEPROM 61, and a RAM 62. The controller 130 is one example of a first controller.

The ROM 37 stores an OS (the abbreviation for Operating System) program 37A, a control program 37B, a communication program 37C, or the like. The control program 37B is a program which performs a printing process (to be described later) or the like. The communication program 37C is a program which controls the communication with external equipment such as the information collection server 40. An OS program 37A is a program different from the control program 37B, and further is a program which controls an operation different from the operation controlled by the communication program 37C. The OS program 37A, the control program 37B, and the communication program 37C are executed when the command described in an address is processed by the CPU 35. Hereinafter, the operation which is processed by executing the OS program 37A, the control program 37B, and the communication program 37C may be described as the operation of the controller 130 in some cases. The controller 130 may have a hardware circuit which uses an IC which implements the partial or entire operation executed by the OS program 37A, the control program 37B, and the communication program 37C.

The EEPROM 61 stores the device information of the printer 10. The device information includes identification information of the printer 10. The identification information of the printer 10 is, for example, a MAC address or a serial number of the printer 10.

Further, the EEPROM 61 stores a first discharge value, a second discharge value, an initial cartridge residual-amount value, an initial tank residual-amount value, an S_Empty flag, a C_Empty flag, an urgent flag, and a transmission completion flag. Details will be described in a printing process to be described below.

The communication bus 39 is connected with the head 21, a communication interface (hereinafter referred to as a communication I/F) 31, the installation sensor 32, the liquid level sensor 33, the contact 152, a clock 30, the display 28, the motor (not illustrated), and the like. The clock 30 outputs date/time information. The communication I/F 31 is connected to the communication line 6. The communication I/F 31 is one example of a first communication interface.

The controller 130 rotates the feed roller 23, the conveyance roller 25, and the discharge roller 27 by driving the motor (not illustrated) through the communication bus 39. In addition, the controller 130 outputs a driving signal to a driving element of the head 21 through the communication bus 39, thereby causing the head 21 to discharge ink droplets.

The controller 130 detects through the installation sensor 32 whether the cartridge 200 is installed in the installation case 150. Further, the controller 130 detects through the liquid level sensor 33 whether the liquid level of the ink stored in the liquid chamber 171 is equal to or higher than the reference position P.

The controller 130 reads the identification information, the serial number, and the cartridge residual-amount value stored in the memory of the IC chip 34 through the electrode 248 of the cartridge 200 installed in the installation case 150, and the contact 152. Further, the controller 130 updates the value of the cartridge residual-amount value stored in the memory of the IC chip 34 through the electrode 248 of the cartridge 200 installed in the installation case 150, and the contact 152.

(Information Collection Server)

The information collection server 40 may be installed on the communication line 6 such as the Internet by a vendor of the printer 10, and may be installed by a business operator different from the vendor. The information collection server 40 includes a CPU 41, a storage part 42, a communication interface 43 for printer (hereinafter, referred to as a communication I/F 43), a communication interface 44 for a sending server (hereinafter, referred to as a communication I/F 44), a clock 48, and a communication bus 49. The CPU 41, the storage part 42, and the communication bus 49 constitutes a controller 45. The clock 48 outputs date/time information. The communication I/F 43 is connected to the communication line 6, and communicates with the printer 10 or the sending server 50. The controller 130 of the printer 10 and the controller 45 of the information collection server 40 are examples of a controller system. The controller 45 of the information collection server 40 is an example of a second controller. The communication I/F 44 is an example of a first communication I/F.

The storage part 42 has a program storage region 46 and a data storage region 47. The program storage region 46 is a hard disk or the like. The data storage region 47 is an RAM, a hard disk, or the like.

The program storage region 46 stores programs such as an OS program 46A, a control program 46B, and a communication program 46C. The control program 46B executes a process (to be described later). The communication program 46C controls communication with the printer 10 or the ordering server 50. The OS program 46A is a program different from the control program 46B, and further is a program which performs the control different from the communication program 46C. Hereinafter, the OS program 46A, the control program 46B, and the communication program 46C are executed when a command is copied to the RAM from the hard disk, the CPU 41 sequentially executes the command copied to the RAM. Hereinafter, the operation which is processed by executing the OS program 46A, the control program 46B, and the communication program 46C may be described as the operation of the controller 45 or the information collection server 40 in some cases.

(Sending Server)

The sending server 50 may be installed on the communication line 6 such as the Internet by a vendor of the printer 10, and may be installed by a business operator different from the vendor. The sending server 50 offers a service to send the cartridge 200 to the user of the printer 10 in response to the demand from the information collection server 40.

The sending server 50 includes a CPU 51, a storage part 52, a communication interface 53 (hereinafter, referred to as a communication I/F 53), and a communication bus 54. The CPU 51, the storage part 52, and the communication bus 54 constitutes a controller 55. The communication I/F 53 communicates with the information collection server 40. The CPU 51, the storage part 52, the communication I/F 53, and the communication bus 54 have the same configuration as the CPU 41, the storage part 42, the communication I/F 43, and the communication bus 49 of the information collection server 40.

(Ink Management by Delivery System)

In the delivery system 5, the information collection server 40 collects the management information including information on the residual amount of the ink from the printer 10, and places an order of the cartridge 200 with respect to the sending server 50 when the residual amount of the ink is small. As described above, the information collection server 40 performs the management of the residual ink amount and the ordering of the cartridge 200, thereby saving the labor of the user of the printer 10 for the management of the residual ink amount and the purchase of the cartridge 200.

Specifically, the user of the printer 10 makes a contract with a manufacturer who performs the management of the residual ink amount and the ordering service of the cartridge 200. The management of the residual ink amount and the ordering service of the cartridge 200 are services contracted with each of printers. At the time of contracting, the user information or the identification information of the printer 10 which is a contract object is registered in the information collection server 40. The user information is destination information such as a name and an address of a user of a delivery destination of the cartridge 200. The identification information is information for identifying the individual of the printer 10 as the contract object and is a serial number, a MAC address, or the like of the printer 10.

The identification information of the printer 10 and the user information are associated with each other and are registered in the information collection server 40. Hereinafter, processes of the printer 10, the information collection server 40, and the sending server 50 regarding the ordering of the cartridge 200 will be described in detail.

(Process Executed by Controller of Printer)

The process executed by the controller 130 of the printer 10 is described with reference to the flowcharts illustrated in FIGS. 7 to 9. Execution orders of the following processes can be appropriately changed within the range of the disclosure.

(Printing Process)

Figure 7:
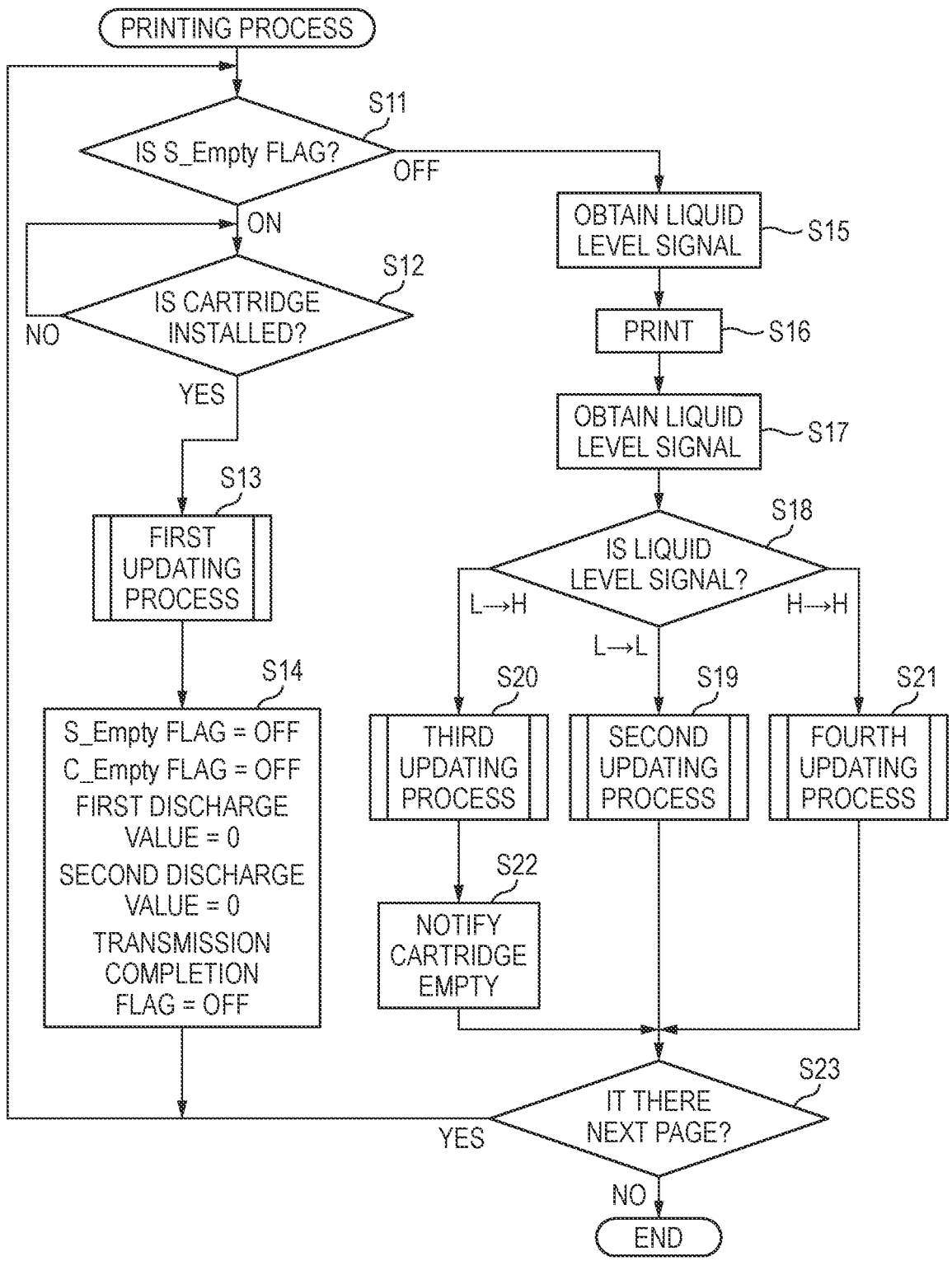
FIG. 7 is a flowchart of a printing process according to the first illustrative embodiment.

The controller 130 executes a printing process illustrated in FIG. 7 in response to a printing instruction input to the printer 10. An acquisition destination of the printing instruction is not particularly limited, but, for example, a user's operation corresponding to the printing instruction may be received through an operation panel 22 or the display 28, or may be received from an external device through the communication I/F 31. The printing instruction is an example of a discharge instruction. The printing instruction includes image data indicating an image. The image data is stored in the RAM 52 of the printer 10.

First, the controller 130 determines whether a value of an S_Empty flag stored in the EEPROM 61 is "ON" or "OFF" (S11). Before the liquid level of the ink stored in the liquid chamber 171 of the tank 160 reaches the upper end of the outflow port 174 through which the ink flows out from the tank 160, the controller 130 stores "ON" in the S_Empty flag of the EEPROM 61. The value of the S_Empty flag of the EEPROM 61 is stored as "OFF" until being stored as "ON". When the liquid level of the ink reaches the upper end of the outflow port 174, there is a concern that air enters the nozzle of the head 21. When the air having entered the nozzle of the head 21 remains in the nozzle, the concern that the ink is prevented from entering the nozzle, or the ink droplets is prevented from being discharged from the nozzle is created.

That is, the S_Empty flag is intended to prevent the air from entering the nozzle of the head 21. The controller 130 stores "OFF" in the S_Empty flag of the EEPROM 61 in step S14 (to be described later), and stores "ON" in the S_Empty flag of the EEPROM 61 in step S65. Although not illustrated in the flowchart, the controller 130 prohibits the discharge of the ink through the head 21 when the value of the S_Empty flag of the EEPROM 61 is "ON". In addition, when the value of the S_Empty flag of the EEPROM 61 is "OFF", the controller 130 allows the ink to be discharged through the head 21.

When it is determined that the value of the S_Empty flag of the EEPROM 61 is "ON" (S11: ON), the controller 130 obtains an installation signal from the installation sensor 32 at predetermined time intervals. Next, the controller 130 determines whether the obtained installation signal changes from the low-level signal (hereinafter, referred to as "L") to the high-level signal (hereinafter, referred to as "H"), and the obtained installation signal changes from "H" to "L" (S12). That is, whether the cartridge 200 is installed is determined by the change of the installation signal. Hereinafter, by determining whether the obtained installation signal changes from "L" to "H", and the obtained installation signal changes from "H" to "L", the controller 130 determines whether the cartridge 200 is installed. In addition, when the controller 130 determines that the obtained installation signal changes from "L" to "H", and the obtained installation signal changes from "H" to "L" (S12: Yes), it is considered that the controller 130 determines that the cartridge 200 is installed.

When the controller 130 determines that the cartridge 200 is not installed (S12: No), the installation signal is continuously obtained regularly from the installation sensor 32.

When it is determined that the cartridge 200 is installed (S12: Yes), the controller 130 executes a first updating process (S13). The process of step S12 is exemplified as a specific example in which the controller 130 determines whether the cartridge 200 is installed, but the disclosure is not limited thereto. For example, whether the cartridge 200 is installed may be determined by using the serial number. The controller 130 reads the serial number of the cartridge 200 from the memory of the IC chip 34 of the cartridge 200. Then, the controller 130 determines whether the read serial number and the serial number stored in the EEPROM 61 coincide with each other. The serial number stored in the EEPROM 61 indicates a serial number which is stored in the memory of the IC chip 34 of the cartridge 200 which is installed in the installation case 150 before a new cartridge 200 is installed in the installation case 150. In that case, in a specific example in which the controller determines that the cartridge 200 is installed, the controller 130 determines that the serial number read from the memory of the IC chip 34 and the serial number stored in the EEPROM 61 do not coincide with each other.

(First Updating Process)

Figure 8A:
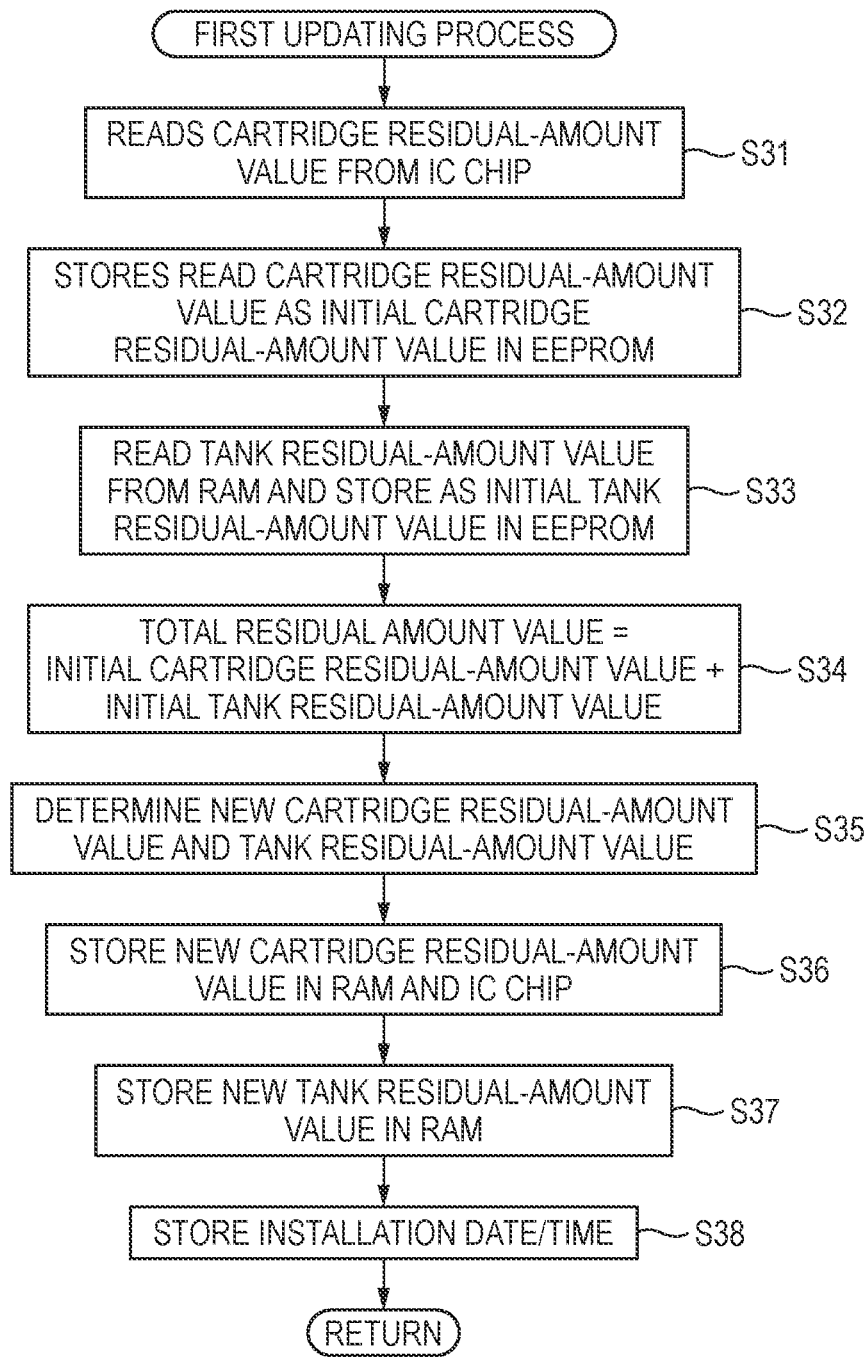
FIG. 8A is a flowchart of a first updating process.

The first updating process illustrated in FIG. 8A is a process that the controller 130 updates an initial cartridge residual-amount value and an initial tank residual-amount value stored in the EEPROM 61, and the cartridge residual-amount value stored in the IC chip 34 of the cartridge 200.

First, the controller 130 reads the cartridge residual-amount value stored in the memory of the IC chip 34 from the memory of the IC chip 34 of the cartridge 200 installed in the installation case 150 through the contact 152 (S31). The controller 130 stores the read cartridge residual-amount value as the initial cartridge residual-amount value in the EEPROM 61 (S32).

The controller 130 reads the tank residual-amount value from the RAM 62 (S33). When the tank residual-amount value is not stored in the RAM 62 due to the power-off or the like, similarly to a fourth updating process (to be described later), the controller 130 calculates the tank residual-amount value and stores the calculated tank residual-amount value in the RAM 62. The tank residual-amount value read from the RAM 62 is a value indicating the residual ink amount which is stored in the liquid chamber 171 of the tank 160 immediately before the cartridge 200 is installed. In other words, the tank residual-amount value is a value indicating the residual ink amount which is stored in the liquid chamber 171 of the tank 160 when the cartridge 200 is pulled. The controller 130 stores the tank residual-amount value read from the RAM 62 as the initial tank residual-amount value in the EEPROM 61 (S33).

The controller 130 adds the initial cartridge residual-amount value and the initial tank residual-amount value, and calculates a total residual amount value indicating the total residual amount of the ink (S34). The controller 130 determines a new cartridge residual-amount value and a new tank residual-amount value from the calculated total residual amount value (S35).

Specifically, when a new cartridge 200 is installed in the installation case 150, the ink stored in the liquid chamber 210 partially flows out to the liquid chamber 171 of the tank 160 from the liquid chamber 210 of the cartridge 200. The flow-out of the ink from the liquid chamber 210 of the cartridge 200 to the liquid chamber 171 of the tank 160 is stopped when there is almost no difference between the water head of the ink stored in the liquid chamber 210 of the cartridge 200 and the water head of the ink stored in the liquid chamber 171 of the tank 160. The new cartridge residual-amount value and the new tank residual-amount value indicate residual ink amounts in a state where there is almost no difference between the water head of the ink stored in the liquid chamber 210 of the cartridge 200 and the water head of the ink stored in the liquid chamber 171 of the tank 160.

The cartridge residual-amount value and the tank residual-amount value may be determined by calculation of the controller 130 based on a formula stored in the EEPROM 61 or the ROM 37, for example. Otherwise, the cartridge residual-amount value and the tank residual-amount value may be determined based on a table stored in the EEPROM 61 or the ROM 37 by the controller 130, for example. Specifically, the shape of the liquid chamber 210 of the cartridge 200 and the shape of the liquid chamber 171 of the tank 160 are predetermined by designing. Therefore, when the total residual amount value of the ink is determined, the cartridge residual-amount value and the tank residual-amount value are also determined in a state where there is almost no difference between the water head of the ink stored in the cartridge 200 and the water head of the ink stored in the tank 160. The EEPROM 61 or the ROM 37 stores a formula for calculating the cartridge residual-amount value and the tank residual-amount value from the total residual amount value in advance. Otherwise, the EEPROM 61 or the ROM 37 stores a table which indicates a correlation among the total residual amount value, the cartridge residual-amount value, and the tank residual-amount value in advance. The controller 130 determines the new cartridge residual-amount value and the new tank residual-amount value based on the total residual amount value of the ink and the formula or the table.

The controller 130 stores the determined new cartridge residual-amount value in the RAM 62 and updates the cartridge residual-amount value stored in the memory of the IC chip 34 (S36). In addition, the controller 130 stores the determined new tank residual-amount value in the RAM 62 (S37). Next, the controller 130 stores the date/time information output from the clock 30 as an installation date/time in the EEPROM 61 (S38), and ends the first updating process.

As illustrated in FIG. 7, when the first updating process ends (S13), the controller 130 stores "OFF" in the S_Empty flag of the EEPROM 61, stores "OFF" in a C_Empty flag of the EEPROM 51, stores "ON" in a cartridge installation flag of the EEPROM 61, stores zero as a first discharge value and a second discharge value of the EEPROM 61, stores "OFF" in the urgent flag of the EEPROM 61, and stores "OFF" in the transmission completion flag of the EEPROM 61 (S14). The controller 130 executes the process of step S11 again after execution of the process of step S14. The C_Empty flag, the first discharge value, the second discharge value, the urgent flag, and the transmission completion flag will be described below.

When it is determined that the value of the S_Empty flag of the EEPROM 61 is "OFF" (S11: OFF), the controller 130 obtains a signal (hereinafter, referred to as the liquid level signal) from the liquid level sensor 33 (S15). Thereafter, the controller 130 performs printing on the sheet according to the image data stored in the RAM 62 (S16). The ink is discharged through the head 21 when the image is printed on the sheet. When the ink is discharged, the liquid level of the ink in the tank 160 is lowered. The controller 130 obtains the liquid level signal from the liquid level sensor 33 after execution (S16) of the printing (S17). Next, the controller 130 determines the liquid level signal obtained in step S15 and the liquid level signal obtained in step S17 (S18).

Hereinafter, in the controller 130, the low-level signal obtained from the liquid level sensor 33 may be described as "L". In addition, in the controller 130, the high-level signal obtained from the liquid level sensor 33 may be described as "H".

The controller 130 executes a second updating process (S19) when it is determined that all the liquid level signals obtained in steps S15 and S17 are "L" (S18: L→L). In step S18, when the controller 130 determines that the liquid level signals obtained in steps S15 and S17 are "L", the ink stored in the liquid chamber 171 of the tank 160 is in the following state. That is, the position of the liquid level of the ink stored in the liquid chamber 171 of the tank 160 before the execution (S16) of the printing is equal to or higher than the reference position P (the liquid level signal obtained in step S15 is "L"). Further, the position of the liquid level of the ink is stored in the liquid chamber 171 of the tank 160 after the execution (S16) of the printing is equal to or higher than the reference position P (the liquid level signal obtained in step S17 is "L"). That is, after execution (S16) of the printing, the ink is present in the liquid chamber 210 of the cartridge 200 when the liquid level signal which the controller 130 obtains in step S17 is "L".

(Second Updating Process)

Figure 8B:
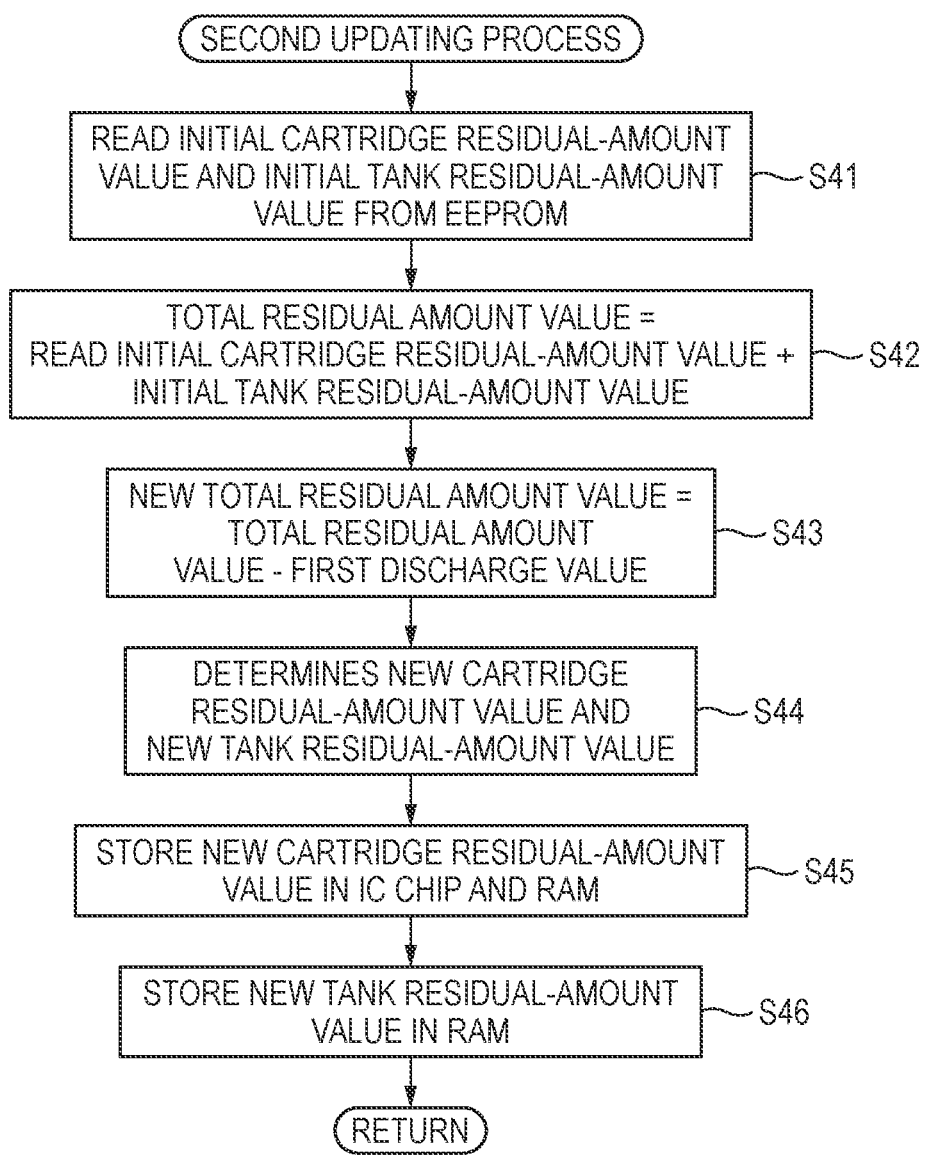
FIG. 8B is a flowchart of a second updating process.

The second updating process illustrated in FIG. 8B is a process that the controller 130 determines a new cartridge residual-amount value and a new tank residual-amount value from the first discharge value indicating the amount of the ink which is discharged through the head 21 at the printing or maintenance. For example, the first discharge value is a value obtained by multiplying the amount of one droplet of the ink discharged to the head 21 by the number of discharging the one droplet of the ink. The controller 130 instructs the head 21 to discharge the ink to count the first discharge value corresponding to the instruction. The controller 130 counts the first discharge value corresponding to the amount of the ink which the head 21 discharges until the present time since the cartridge 200 is installed. That is, the first discharge value is an integration value of the amount of the ink which the head 21 discharges until the present time since the cartridge 200 is installed. The first discharge value is stored in the EEPROM 61. The first discharge value is an example of a discharge amount.

First, the controller 130 reads the initial cartridge residual-amount value and the initial tank residual-amount value from the EEPROM 61 (S41). Next, the controller 130 calculates a total residual amount value by adding the read initial cartridge residual-amount value and the read initial tank residual-amount value (S42). The controller 130 calculates a new total residual amount value by subtracting the first discharge value from the calculated total residual amount value (S43). Thereafter, similarly to the above description, the controller 130 determines the new cartridge residual-amount value and the new tank residual-amount value by using the formula or the table (S44).

The controller 130 stores the determined new cartridge residual-amount value in the RAM 62 and updates the cartridge residual-amount value stored in the memory of the IC chip 34 (S45). In addition, the controller 130 stores the determined new tank residual-amount value in the RAM 62 (S46), and ends the second updating process.

As illustrated in FIG. 7, when the second updating process (S19) ends, the controller 130 determines whether the image data on the next page is stored in the RAM 62 (S23). When it is determined that the image data on the next page is stored in the RAM 62 (S23: Yes), the controller 130 executes the process of step S11 again. When it is determined that the image data on the next page is not stored in the RAM 62 (S23: No), the controller 130 ends the printing process.

The above-described determining method of the cartridge residual-amount value and the tank residual-amount value is merely one example. The cartridge residual-amount value and the tank residual-amount value may be determined by another method.

When it is determined that the value of the S_Empty flag of the EEPROM 61 is "OFF" (S11: OFF), the controller 130 executes the processes of steps S15 to S18 again. When it is determined that the liquid level signal obtained in step S15 is "L", and the liquid level signal obtained in step S17 is "H" (S18: L→H), the controller 130 executes a third updating process (S20). In step S18, when the controller 130 determines that the liquid level signal obtained in step S15 is "L", and the liquid level signal obtained in S17 is "H", the ink stored in the liquid chamber 171 of the tank 160 is in the following state. That is, the position of the liquid level of the ink stored in the liquid chamber 171 of the tank 160 before execution (S16) of the printing is equal to or higher than the reference position P (the liquid level signal obtained in step S15 is "L"). Further, the position of the liquid level of the ink stored in the liquid chamber 171 of the tank 160 after execution (S16) of the printing is lower than the reference position P (the liquid level signal obtained in step S17 is "H"). That is, it means that the ink having been in the liquid chamber 210 of the cartridge 200 during the execution (S16) of the printing is not present. In other words, it means that the ink which is stored in the liquid chamber 210 of the cartridge 200 during the execution (S16) of the printing is used up.

(Third Updating Process)

Figure 8C:
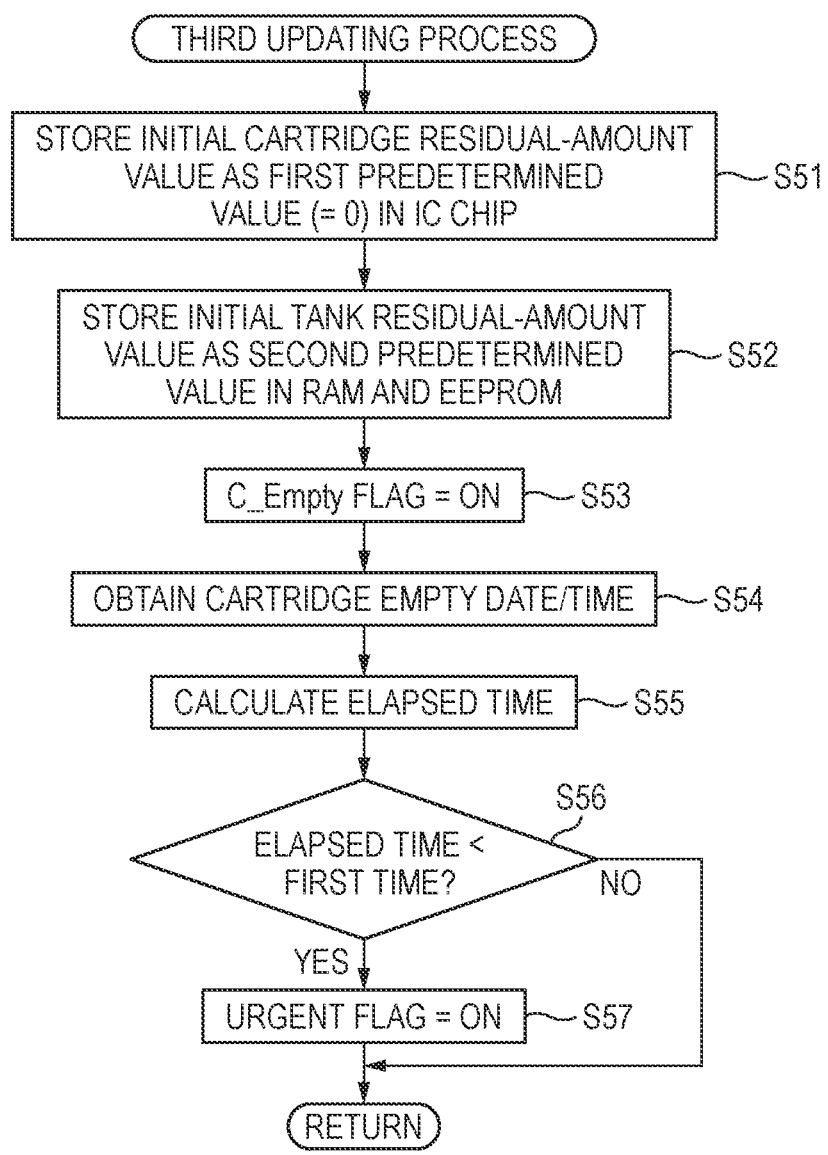
FIG. 8C is a flowchart of a third updating process.

The third updating process illustrated in FIG. 8C is a process that the controller 130 updates the initial cartridge residual-amount value as a first predetermined value and updates the initial tank residual-amount value as a second predetermined value. Specifically, the first discharge value which indicates the amount of the ink which is discharged through the head 21 for the printing or the like includes errors. For example, although the controller 130 instructs the head 21 to discharge a specified amount of the ink, the amount of the ink which is actually discharged from the head 21 is different from the specified amount instructed to the head 21 in some cases. For example, this difference may result from the temperature at the time of instructing the discharge of the ink. Since the viscosity of ink increases as the temperature is lowered, and the ink is hard to be discharged through the nozzle 29. Further, when the controller 130 repeatedly issues the above instruction to the head 21, the difference between the amount of the ink which is actually discharged through the head 21 repeatedly and the repeated amount of the specified amount may become larger. That is, there is a possibility that errors in the amount indicated by the calculated first discharge value and the amount which is actually discharged through the head 21 are integrated every time of printing.

Since the cartridge residual-amount value is determined based on the first discharge value, errors occur between the residual ink amount indicated by the cartridge residual-amount value and the actual residual ink amount stored in the liquid chamber 210. In addition, since the tank residual-amount value is determined based on the first discharge value, errors occurs between the residual ink amount indicated by the tank residual-amount value and the actual residual ink amount stored in the liquid chamber 171. Therefore, the cartridge residual-amount value and the tank residual-amount value which are determined every time of printing include integrated errors. The third updating process is a process that resets the integrated errors.

Specifically, the controller 130 updates the initial cartridge residual-amount value stored in the memory of the IC chip 34 as the first predetermined value (S51). For example, the first predetermined value is "zero". In addition, the controller 130 stores the initial tank residual-amount value as the second predetermined value in the RAM 62 and the EEPROM 61 (S52). The second predetermined value is a value which indicates the amount of the ink stored in the liquid chamber 171 of the tank 160 when the liquid level of the ink is at the reference position P. For example, the first predetermined value and the second predetermined value are stored in the ROM 37 in advance.

Next, the controller 130 stores "ON" in the C_Empty flag of the EEPROM 61 (S53). Subsequently, the controller 130 obtains date/time information output from the clock 30 as a cartridge empty date/time (S54). Then, the controller 130 calculates an elapsed time from the installation date/time stored in the EEPROM 61 in step S38 to the cartridge empty date/time obtained in step S54 (S55). The cartridge empty indicates that the ink stored in the liquid chamber 210 of the cartridge 200 has been used up.

The controller 130 determines whether the calculated elapsed time is less than the first time stored in the ROM 37 or the EEPROM 61 (S56). The controller 130 stores "ON" in the urgent flag of the EEPROM 61 and ends the third updating process when determining that the calculated elapsed time is less than the first time (S56: Yes). On the other hand, the controller 130 skips the process of step S57 and ends the third updating process when determining that the calculated elapsed time is equal to or longer than the first time (S56: No). That is, when the calculated elapsed time is equal to or longer than the first time, the urgent flag of the EEPROM 61 remains "OFF" stored in step S14.

The first time is a threshold, and the controller 130 determines whether the discharge rate of the ink stored in the liquid chamber 210 of the cartridge 200 is fast based on the threshold. Specifically, the fact that the elapsed time, which is a time from when the cartridge 200 is installed in the installation case 150 until the ink stored in the liquid chamber 201 of the cartridge 200 is used up, is short means that the discharge rate of the ink stored in the liquid chamber 201 of the cartridge 200 is fast. Depending on whether the elapsed time is less than the first time, the controller determines whether the discharge rate of the ink stored in the liquid chamber 201 of the cartridge 200 is fast. That is, the urgent flag of the EEPROM 61 stores "ON" when the discharge rate of the ink stored in the liquid chamber 201 of the cartridge 200 is fast. On the other hand, the urgent flag of the EEPROM 61 stores "OFF" when the discharge rate of the ink stored in the liquid chamber 201 of the cartridge 200 is not fast.

As illustrated in FIG. 7, when the third updating process (S20) ends, the controller 130 notifies a cartridge empty state in which the ink stored in the liquid chamber 210 of the cartridge 200 is used up (S22). Specifically, the controller 130 displays a cartridge empty image which indicates the use-up of the ink stored in the liquid chamber 210 of the cartridge 200 or the exchange of the cartridge 200 on the display 28. For example, the notification of the cartridge empty state is executed until "OFF" is stored in the C_Empty flag of the EEPROM 61 in step S14. That is, the cartridge empty image is displayed on the display 28 until a new cartridge 200 is installed since the ink stored in the liquid chamber 210 of the cartridge 200 is used up.

The display 28 is an example of a notification device (which may also be referred to as an alarm). The printer 10 may include a speaker instead of the display 28 or in addition to the display 28. In this case, the controller 130 causes the speaker to output an alarm sound in step S22. The speaker is an example of a notification device (which may also be referred to as an alarm). The printer 10 may include a lamp such as an LED instead of the display 28 or in addition to the display 28. In this case, the controller 130 causes the lamp such as an LED to blink or light up in step S22. The lamp is an example of a notification device (which may also be referred to as an alarm).

After execution of the process of step S22, the controller 130 determines whether the image data on the next page is stored in the RAM 62 (S23). When it is determined that the image data on the next page is stored in the RAM 62 (S23: Yes), the controller 130 executes the process of step S11 again. When it is determined that the image data on the next page is not stored in the RAM 62 (S23: No), the controller 130 ends the printing process.

When it is determined in the process of step S11 that the value of the S_Empty flag of the EEPROM 61 is "OFF" (S11: OFF), the controller 130 executes the processes of steps S15 to S18 again. When it is determined that all the liquid level signals obtained in steps S15 and S17 are "H" (S18: H→H), the controller 130 executes the fourth updating process (S21). In step S18, when the controller 130 determines that all the liquid level signals obtained in steps S15 and S17 are "H", the ink stored in the liquid chamber 171 of the tank 160 is in the following state. That is, the position of the liquid level of the ink stored in the liquid chamber 171 of the tank 160 before execution (S16) of the printing is lower than the reference position P (the liquid level signal obtained in step S15 is "H"). Further, the position of the liquid level of the ink is stored in the liquid chamber 171 of the tank 160 after execution (S16) of the printing is lower than the reference position P (the liquid level signal obtained in step S17 is "H"). That is, immediately after execution (S16) of the printing, the ink is not present in the liquid chamber 210 of the cartridge 200.

(Fourth Updating Process)

Figure 8D:
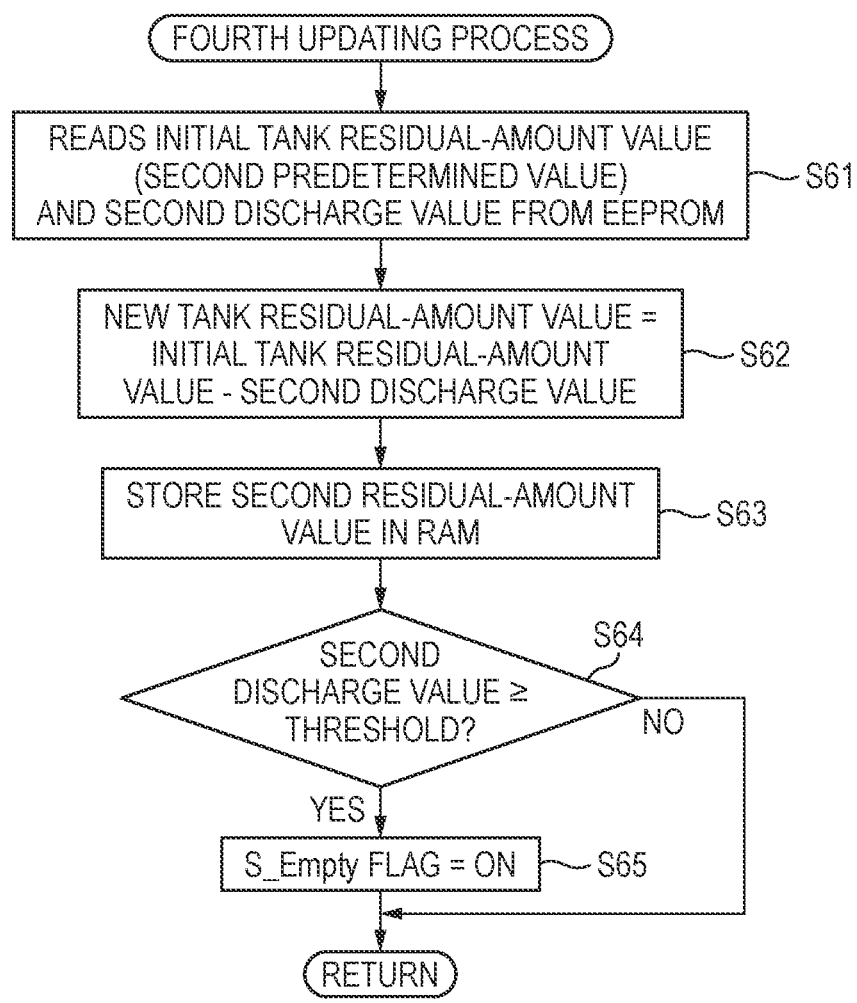
FIG. 8D is a flowchart of a fourth updating process.

The fourth updating process illustrated in FIG. 8D is a process that the controller 130 calculates the tank residual-amount value, and determines whether the printing is prohibited. First, the controller 130 reads the initial tank residual-amount value updated as the second predetermined value from the EEPROM 61 (S61). The controller 130 subtracts the second discharge value from the read initial tank residual-amount value to calculate the new tank residual-amount value (S62). For example, similarly to the first discharge value, the second discharge value is a value obtained by multiplying the amount of one droplet of the ink discharged to the head 21 by the number of discharging the one droplet of the ink. The controller 130 instructs the head 21 to discharge the ink to count the second discharge value corresponding to the instruction. After the liquid level signal obtained from the liquid level sensor 33 is changed from "L" to "H", the controller 130 counts the second discharge value which indicates the amount of the ink which is discharged through the head 21 until the present time. That is, the second discharge value is an integration value of the amount of the ink which the head 21 discharges until the present time since the liquid level signal obtained from the liquid level sensor 33 is changed from "L" to "H". The second discharge value is stored in the EEPROM 61.

The controller 130 stores the calculated new tank residual-amount value in the RAM 62 (S63). Next, the controller 130 determines whether the counted second discharge value reaches a threshold (S64). The threshold is a value which is stored in the ROM 37 or the EEPROM 61 in advance. When it is determined that the counted second discharge value does not reach the threshold (S64: Yes), the controller 130 ends the fourth updating process. On the other hand, when it is determined that the counted second discharge value reaches the threshold (S64: No), the controller 130 stores "ON" in the S_Empty flag of the EEPROM 61 (S65), and ends the fourth updating process. Although the flowchart is not illustrated, when it is determined that "ON" is stored in the S_Empty flag of the EEPROM 61, the controller 130 prohibits the discharging of the ink through the head 21 including the printing and the maintenance.

The threshold is such a value that the liquid level of the ink stored in the liquid chamber 171 of the tank 160 is positioned slightly above the outflow port 174 when the second discharge value reaches the threshold. Specifically, in some cases, errors occur between the reference position P which the liquid level sensor 33 is designed to detect and the reference position P which the liquid level sensor 33 actually detects. For example, the errors occur due to faults of the operation of the actuator 190. The threshold is such a value that the liquid level of the ink stored in the liquid chamber 171 of the tank 160 is not overlapped with the outflow port 174 when the second discharge value reaches the threshold although the errors are the maximum errors which can be assumed at the time of designing. The controller 130 prohibits the discharge of the ink through the head 21 to prevent the air from entering the head 21. In addition to the above-described errors, the threshold may be such a value that the liquid level of the ink stored in the liquid chamber 171 of the tank 160 is not overlapped with the outflow port 174 when the second discharge value reaches the threshold although the printer 10 is placed on the surface of a predetermined inclination angle in consideration that the printer 10 is placed on the inclined surface. In addition, the second discharge value may include errors similarly to the first discharge value in some cases. The threshold may be such a value that the liquid level of the ink stored in the liquid chamber 171 of the tank 160 is not overlapped with the outflow port 174 when the second discharge value reaches the threshold although the errors in the second discharge value are the maximum.

As illustrated in FIG. 7, when the fourth updating process (S21) ends, the controller 130 determines whether the next page is stored in the RAM 62 (S23). When it is determined that the next page is stored in the RAM 62 (S23: Yes), the controller 130 executes the process of step S11 again. When it is determined that the next page is not stored in the RAM 62 (S23: No), the controller 130 ends the printing process.

As described above, whenever the printing of step S16 is executed, the controller 130 determines the cartridge residual-amount value and the tank residual-amount value based on the amount of the ink used to print. In the above description, an example of determining the cartridge residual-amount value and the tank residual-amount value whenever the controller 130 executes the printing of one page has been described. However, instead of this method, the controller 130 may determine the cartridge residual-amount value and the tank residual-amount value every time of executing printing of one pass. In addition, the controller 130 executes the second updating process, the third updating process, and the fourth updating process at the time of discharging the ink through the head 21 for the maintenance or the like as well as at the time of printing. The executing instruction of the maintenance is one example of the discharge instruction.

(Contact Information Transmitting Process)

Figure 9:
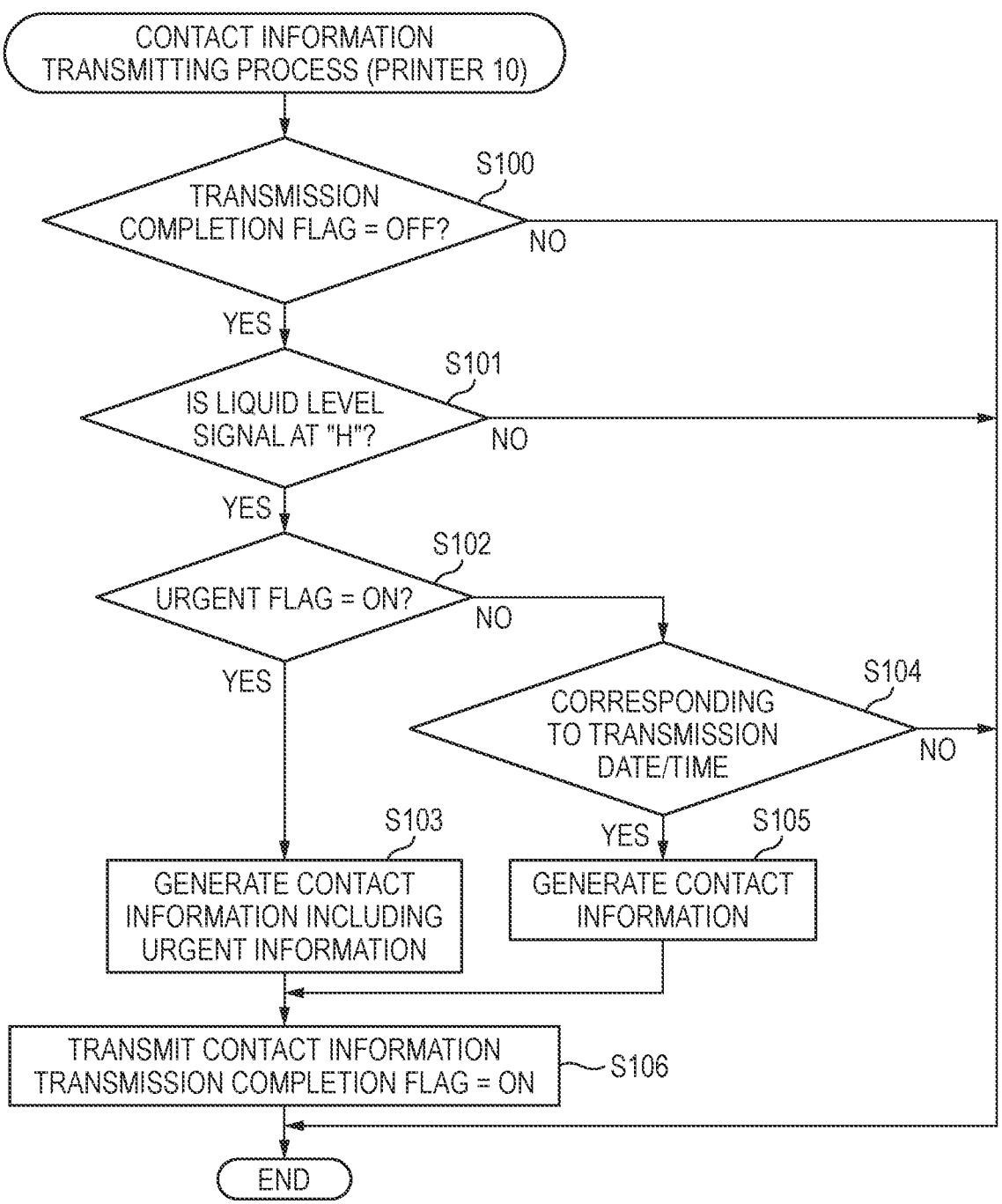
FIG. 9 is a flowchart of a contact information transmitting process.

The controller 130 of the printer 10 periodically executes a contact information transmitting process illustrated in FIG. 9. Specifically, the controller 130 executes the contact information transmitting process when date/time information output from the clock 30 becomes a predetermined time stored in the ROM 37 or the EEPROM 61. For example, the predetermined time is a time such as five minutes, ten minutes, or one hour. The controller 130 executes the contact information transmitting process every predetermined time. The controller 130 may execute the contact information transmitting process at predetermined time intervals. For example, the controller 130 executes the contact information transmitting process when the time measured by the clock 30 reaches a predetermined time (for example, five minutes, ten minutes, or one hour).

The contact information transmitting process is a process in which the printer 10 transmits contact information to the information collection server 40. The contact information is information used to determine whether the information collection server 40 transmits order information indicating the order of the cartridge 200 to the sending server 50. Referring to FIG. 9, details of the contact information transmitting process will be described.

First, the controller 130 determines whether the value of the transmission completion flag of the EEPROM 61 is "OFF" (S100). When determining that the value of the transmission completion flag of the EEPROM 61 is not "OFF", that is, "ON" (S100: No), the controller 130 ends the contact information transmitting process. When determining that the value of the transmission completion flag of the EEPROM 61 is "OFF" (S100: Yes), the controller 130 obtains a liquid level signal from the liquid level sensor 33 and determines whether the obtained liquid level signal is "H" (S101).

In step S101, that is, it is determined whether the ink stored in the liquid chamber 210 of the cartridge 200 is completely used up before the current contact information transmitting process is executed. When determining that the obtained liquid level signal is not "H" (S101: No), the controller 130 ends the contact information transmitting process.

On the other hand, when determining that the obtained liquid level signal is "H" (S101: Yes), the controller 130 executes a process shown in step S102. In step S102, the controller 130 determines whether the urgent flag stored in the EEPROM 61 is "ON" (S102). When the value of the urgent flag stored in the EEPROM 61 is "ON", the elapsed time from when the cartridge 200 is installed until the liquid level of the ink stored in the liquid chamber 171 reaches a reference position P is relatively short. That is, when the value of the urgent flag stored in the EEPROM 61 is "ON", the discharge rate of the ink stored in the liquid chamber 210 of the cartridge 200 is fast.

When determining that the value of the urgent flag stored in the EEPROM 61 is "ON" (S102: Yes), the controller 130 generates contact information including urgent information (S103). Specifically, the controller 130 reads type information of the cartridge 200 from the memory of the IC chip 34 of the cartridge 200, and further reads device information and urgent information of the printer 10 from the EEPROM 61. The controller 130 generates contact information including the read type information, device information, and urgent information. The controller 130 may store the type information read from the memory of the IC chip 34 of the cartridge 200 in the EEPROM 61, and read the type information from the EEPROM 61, the read type information being included in the contact information.

The type information of the cartridge 200 is, for example, information indicating whether the cartridge 200 is a small volume of cartridge or a large volume of cartridge or information indicating a color of the stored ink. The device information of the printer 10 includes identification information of the printer 10, for example, a MAC address or a serial number of the printer 10. The identification information of the printer 10 is stored in the EEPROM 61.

The urgent information is information indicating that the discharge rate of the ink stored in the liquid chamber 210 of the cartridge 200 is fast. The urgent information may be the value (ON) of the urgent flag stored in the EEPROM 61.

On the other hand, when determining that the urgent flag is "OFF" (S102: No), the controller 130 determines whether the date/time information output from the clock 30 corresponds to a predetermined transmission time stored in the EEPROM 61 (S104). The predetermined transmission time is an appointed time every day such as 0 o'clock or 12 o'clock.

When determining that the date/time information output from the clock 30 does not correspond to the predetermined transmission time (S104: No), the controller 130 ends the contact information transmitting process. On the other hand, when determining that the date/time information output from the clock 30 corresponds to the predetermined transmission time (S104: Yes), the controller 130 generates contact information not including the urgent information (S105).

When generating the contact information (S103, S105), the controller 130 transmits the contact information to the information collection server 40 through the communication I/F 31 (S106), stores "ON" in the transmission completion flag of the EEPROM 61, and ends the contact information transmitting process. The contact information transmitted from the printer 10 is received by the information collection server 40.

(Order Information Transmitting Process)

Figure 10A:
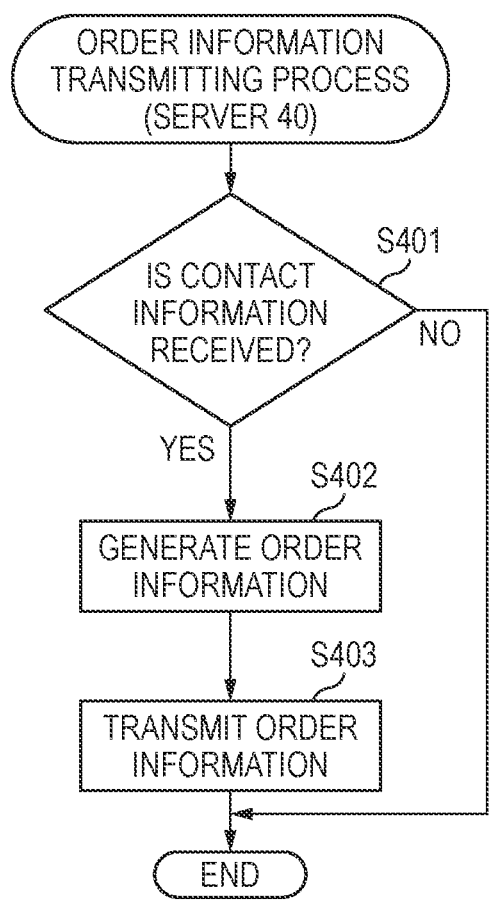
FIG. 10A is a flowchart of an order information transmitting process.

Details of the order information transmitting process executed by the controller 45 of the information collection server 40 that has received the contact information will be described with reference to FIG. 10A. The controller 45 of the information collection server periodically executes the contact information transmitting process illustrated in FIG. 10A. Specifically, the controller 45 executes the order information transmitting process when the date/time information output from the clock 48 comes to a predetermined time stored in the storage part 42. For example, the predetermined time is a time such as five minutes, ten minutes, or one hour. The controller 45 executes the order information transmitting process at predetermined time intervals. The controller 45 may execute the order information transmitting process at predetermined time intervals. For example, the controller 45 executes the order information transmitting process when the time measured by the clock 48 reaches a predetermined time (for example, five minutes, ten minutes, or one hour). The controller 45 may execute the order information transmitting process in a time period including the time when the printer 10 transmits the contact information.

First, the controller 45 of the information collection server 40 determines whether the contact information is received through the communication I/F 43 (S401). When determining that the contact information is not received (S401: No), the controller 45 ends the order information transmitting process. On the other hand, when determining that the contact information is received through the communication I/F 43 (S401: Yes), the controller 45 generates order information (S402).

The order information includes, for example, type information of the cartridge 200 included in the contact information and user information including an addressee and an address to which the cartridge 200 is delivered. The controller 45 reads user information corresponding to the identification information of the printer 10 included in the contact information from the storage part 42, and includes the user information in the order information.

Although not illustrated, the controller 45 determines whether the received contact information includes urgent information or the urgent flag having the value of "ON" is included in the contact information. The controller 45 includes designation information in the order information when determining that the received contact information includes urgent information or the urgent flag having the value of "ON" is included in the contact information. The designation information is information indicating delivery such as express delivery with fewer delivery days than ordinary delivery. The order information is an example of first information. The designation information is an example of second information. On the other hand, the controller 45 does not include the designation information in the order information when determining that: the received contact information does not include urgent information; or the urgent flag having the value of "ON" is not included in the contact information.

The designation information may always be included in the order information. In such a case, the controller 45 includes the designation information indicating delivery such as express delivery with fewer delivery days than ordinary delivery when determining that the received contact information includes urgent information or the urgent flag having the value of "ON" is included in the contact information. On the other hand, the controller 45 includes designation information indicating the ordinary delivery in the order information when determining that the received contact information does not include urgent information or the urgent flag having the value of "ON" is not included in the contact information.

When generating the order information (S402), the controller 45 stores the generated order information in the storage part 42 and transmits it to the sending server 50 through the communication I/F 44 (S403). The order information transmitted from the information collection server 40 is received by the sending server 50 through the communication I/F 53.

(Sending Information Generating Process)

Figure 10B:
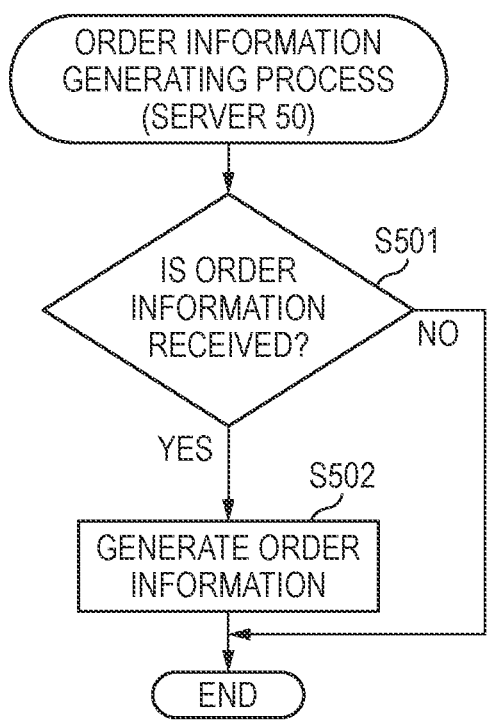
FIG. 10B is a flowchart of a sending information generating process.

With reference to FIG. 10B, a sending information generating process executed by the controller 55 of the sending server 50 for receiving the order information will be described. The controller 55 of the sending server 50 periodically executes an order information generating process. The controller 55 may execute the order information generating process in a time period including the time when the information collection server 40 transmits the contact information. The controller 55 of the sending server 50 determines whether order information is received through the communication I/F 53 (S501). When determining that the order information is not received, the controller 55 ends the sending information generating process (S501: No). On the other hand, when determining that the order information has been received (S501: Yes), the controller 55 generates sending information (S502) and ends the sending information generating process.

The sending information is information indicating that the cartridge 200 indicated by the type information included in the order information is to be sent to the addressee and the address indicated by the user information included in the order information. When the received order information includes the designation information, the controller 55 generates sending information so that the cartridge 200 is sent at the type of delivery (express delivery or ordinary delivery) designated by the designation information. The generated sending information is used for the sending operation of the cartridge 200.

In this illustrative embodiment, the liquid level sensor 33 detects that the ink stored in the cartridge 200 is used up. According thereto, compared to the case of using a first discharge value for detecting that the ink stored in the cartridge 200 is used up, the exhaustion of the ink stored in the cartridge 200 is accurately detected. Based on the detection by the liquid level sensor 33, the transmitted order information is received by the sending server 50. As a result, there is a high possibility that a new cartridge 200 reaches the user after the ink stored in the cartridge 200 is used up. Accordingly, the cartridge 200 in which the ink remains is replaced with a new cartridge 200, and the useless waste of the ink may be reduced.

In this illustrative embodiment, the tank 160 is provided into which the ink flows from the inside of the liquid chamber 210 of the cartridge 200. Therefore, even when the ink stored in the liquid chamber 210 of the cartridge 200 is used up, printing can be continued by the ink stored in the liquid chamber 171 of the tank 160.

In this illustrative embodiment, the controller 130 calculates the elapsed time from when the cartridge 200 is installed in the installation case 150 until the ink stored in the liquid chamber 210 of the cartridge 200 is used up. The controller 130 determines from the calculated elapsed time whether the discharge rate of the ink stored in the liquid chamber 210 of the cartridge 200 is fast. When determining that the discharge rate is fast, the controller 130 transmits the urgent information indicating the fact or the urgent flag having the value of "ON" while including it in the order information. Therefore, there is a high possibility that a new cartridge 200 reaches the user before the ink stored in the liquid chamber 171 of the tank 160 is used up. As a result, it is possible to reduce the concern that the ink stored in the liquid chamber 171 of the tank 160 is used up until a new cartridge 200 reaches the user and the printing cannot be continued. The fact that the ink stored in the liquid chamber 171 of the tank 160 is used up means that the liquid level of the ink stored in the liquid chamber 171 is located slightly above the outflow port 174 as described above.

In this illustrative embodiment, since the designation information indicating the delivery speed is included in the order information, it is possible to further reduce the concern that the ink stored in the liquid chamber 171 of the tank 160 is used up until a new cartridge 200 reaches the user and the printing cannot be continued.

Second Illustrative Embodiment

In the above-described first illustrative embodiment, the description has been given about the example in which, when the controller 130 does not transmit the contact information after the cartridge 200 is installed (S100: Yes in FIG. 9) and determines that the obtained liquid level signal is "H" (S101: Yes in FIG. 9), the controller 130 transmits the contact information to the information collection server 40. That is, the example is described in which the printer 10 transmits the contact information based on the liquid level signal output from the liquid level sensor 33. In a second illustrative embodiment, an example will be described in which, when a new total residual amount value calculated in a fifth updating process (FIGS. 11B1 and 11B2) becomes less than a first predetermined residual amount value, contact information is transmitted from the printer 10 to the information collection server 40. In the second illustrative embodiment, that is, the printer 10 may not include the liquid level sensor 33.

Figure 11A:
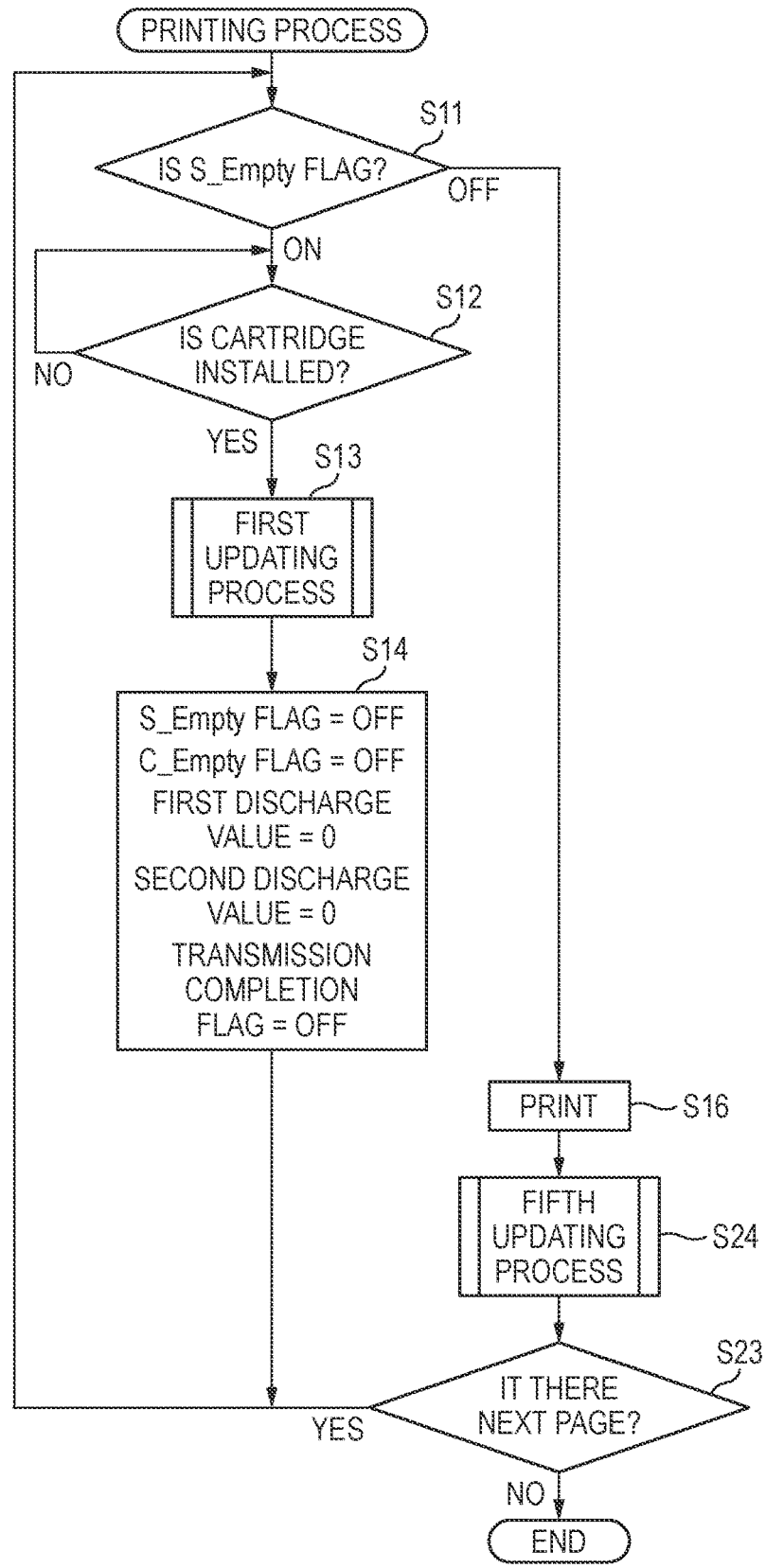
FIG. 11A is a flowchart of a printing process according to a second illustrative embodiment.
Figure 12:
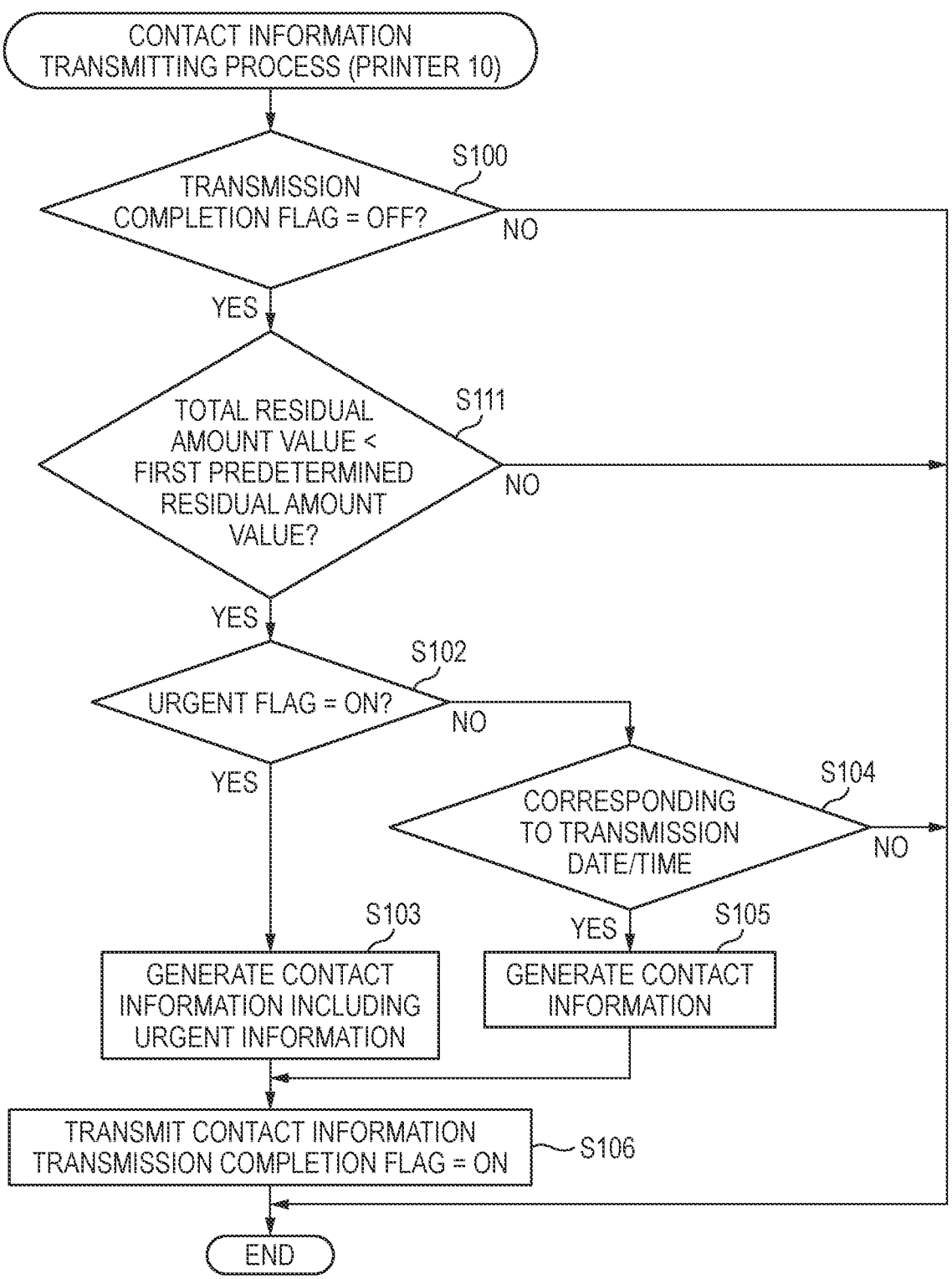
FIG. 12 is a flowchart of a contact information transmitting process according to the second illustrative embodiment.

The second illustrative embodiment differs from the first illustrative embodiment in that the controller 130 of the printer 10 executes a printing process illustrated in FIG. 11A instead of the printing process illustrated in FIG. 7 and executes a contact information transmitting process illustrated in FIG. 12 instead of the contact information transmitting process illustrated in FIG. 9. Processes other than processes described below are the same as the processes described in the first illustrative embodiment. In process illustrated in FIGS. 11A to 11B2 and FIG. 12, the same processes as those of the first illustrative embodiment are denoted by the same reference numerals, and description thereof will not be presented.

The controller 130 of the printer 100 according to the second illustrative embodiment executes a printing process illustrated in FIG. 11A. As in the first illustrative embodiment, the controller 130 executes a process of steps S11 to S14 and a process of step S16. In step S11, the controller 130 executes a fifth updating process after executing the process of step S16 (S24) when determining that a value of an S_Empty flag of the EEPROM 61 is "OFF" (S11: OFF).

The fifth updating process will be described with reference to FIGS. 11B1 and 11B2. Similarly to the second updating process (FIG. 8B) described in the first illustrative embodiment, the controller 130 executes a process of steps S41 to S46. After execution of step S46, the controller 130 determines whether the new total residual amount value calculated in step S43 is less than a second predetermined residual amount value (S71). The second predetermined residual amount value is a theoretical value of the residual ink amount when the ink stored in the liquid chamber 171 of the tank 160 is used up, and is stored in advance in the ROM 37 or the EEPROM 61.

When determining that the new total residual amount value calculated in step S43 is less than the second predetermined residual amount value (S71: Yes), the controller 130 stores "ON" in the S_Empty flag of the EEPROM 61 (S72) and ends the fifth updating process. On the other hand, when determining that the new total residual amount value calculated in step S43 is not less than the second predetermined residual amount value (S71: No), the controller 130 determines whether the new total residual amount value calculated in step S43 is less than a first predetermined residual amount value (S73).

The first predetermined residual amount value is a theoretical value of the residual amount of ink stored in the liquid chamber 171 of the tank 160 at the time when the ink stored in the liquid chamber 210 of the cartridge 200 is used up. The first predetermined residual amount value is stored in advance in the ROM 37 or the EEPROM 61. The new total residual amount value calculated in step S43 is an example of the residual amount including at least the amount of liquid in the second liquid chamber. The first predetermined residual amount value is an example of a predetermined amount.

Instead of determining whether the new total residual amount value calculated in step S43 is less than the first predetermined residual amount value, the controller 130 may determine whether a first discharge value is equal to or more than a predetermined value. The predetermined value is, for example, a value obtained by subtracting the first predetermined residual amount value from the total residual amount value which is the sum of an initial cartridge residual-amount value and an initial tank residual-amount value. Since the new total residual amount value is a value calculated using the first discharge value, the determination as to whether the total residual amount value is less than the first predetermined value is synonymous with the determination as to whether the first discharge value is equal to or more than the predetermined value. Another determination equivalent to the determination whether the total residual amount value is less than the first predetermined residual amount value is included in the determination whether the total residual amount value is less than the first predetermined residual amount value.

When determining that the new total residual amount value calculated in step S43 is not less than the first predetermined residual amount value (S73: No), the controller 130 ends the fifth updating process. On the other hand, when determining that the new total residual amount value calculated in step S43 is less than the first predetermined residual amount value (S73: Yes), the controller 130 stores "ON" in a C_Empty flag of the EEPROM 61 (S74). Next, as in the first illustrative embodiment, the controller 130 executes a process of steps S54 to S57. Thereafter, the controller 130 ends the fifth updating process in response to the execution of the process of step S57.

The printer 10 of the second illustrative embodiment executes the process illustrated in FIG. 12. Specifically, the controller 130 executes the contact information transmitting process illustrated in FIG. 12 when the date/time information output from the clock 30 becomes a predetermined time stored in the ROM 37 or the EEPROM 61. For example, the predetermined time is a time such as five minutes, ten minutes, or one hour. The controller 130 executes the contact information transmitting process at predetermined time intervals. The controller 130 may execute the contact information transmitting process at predetermined time intervals. For example, the controller 130 executes the contact information transmitting process when the time measured by the clock 30 reaches the predetermined time (for example, five minutes, ten minutes, or one hour).

The contact information transmitting process is a process in which the printer 10 transmits contact information to the information collection server 40. The contact information is the same as in the first illustrative embodiment. Details of the contact information transmitting process according to the second illustrative embodiment will be described with reference to FIG. 12. The same process as the contact information transmitting process (FIG. 9) described in the first illustrative embodiment is denoted by the same reference numeral as that in the first illustrative embodiment, and the description thereof will not be presented.

First, the controller 130 of the printer 10 determines whether the value of the transmission completion flag of the EEPROM 61 is "OFF" (S100). When determining that the value of the transmission completion flag of the EEPROM 61 is not "OFF", that is, "ON" (S100: No), the controller 130 ends the contact information transmitting process. When determining that the value of the transmission completion flag of the EEPROM 61 is "OFF" (S100: Yes), the controller 130 determines whether a new total residual amount value calculated in step S43 of the fifth updating process is less than a first predetermined residual amount value (S111).

When determining that the new total residual amount value calculated in step S43 is not less than the first predetermined residual amount value (S111: No), the controller 130 ends the contact information transmitting process. On the other hand, when determining that the new total residual amount value calculated in step S43 is less than the first predetermined residual amount value (S111: Yes), the controller 130 executes the process from step S102 to step S106 as in the first illustrative embodiment, and transmits the contact information to the information collection server 40.

The contact information transmitted from the printer 10 is received by the information collection server 40. Upon receiving the contact information, the information collection server 40 executes the order information transmitting process as in the first illustrative embodiment (FIG. 10A). In addition, the sending server 50, which has received the order information transmitted from the information collection server 40 through the communication I/F 53 by the order information transmitting process illustrated in FIG. 10A executes the sending information generating process as in the first illustrative embodiment (FIG. 10B).

In this second illustrative embodiment, whether the ink stored in the liquid chamber 210 of the cartridge 200 is used up is determined by the total residual amount value calculated based on the first discharge value, instead of the liquid level sensor 33.

In this second illustrative embodiment, since the tank 160 is provided into which the ink flows from the inside of the liquid chamber 210 of the cartridge 200, even when the ink stored in the liquid chamber 210 of the cartridge 200 is used up, printing can be continued with the ink stored in the liquid chamber 171 of the tank 160.

In this second illustrative embodiment, the controller 130 calculates the elapsed time from when the cartridge 200 is installed in the installation case 150 until the ink stored in the liquid chamber 210 of the cartridge 200 is assumed to be used up (cartridge empty date and time). The controller 130 determines from the calculated elapsed time whether the discharge rate of the ink stored in the liquid chamber 210 of the cartridge 200 is fast. When determining that the discharge rate is fast, the controller 130 transmits the urgent information indicating the fact or the urgent flag having the value of "ON" while including it in the order information. Therefore, there is a high possibility that a new cartridge 200 reaches the user before the ink stored in the liquid chamber 171 of the tank 160 is used up. As a result, it is possible to reduce the concern that the ink stored in the liquid chamber 171 of the tank 160 is used up until a new cartridge 200 reaches the user and the printing cannot be continued.

In this second illustrative embodiment, since the designation information indicating the delivery speed is included in the order information, it is possible to further reduce the concern that the ink stored in the liquid chamber 171 of the tank 160 is used up until a new cartridge 200 reaches the user and the printing cannot be continued.

<First Modification>

In the first illustrative embodiment described above, the description has been given about the example in which, when the controller 130 does not transmit the contact information after the cartridge 200 is installed (S100: Yes in FIG. 9) and determines that the obtained liquid level signal is "H" (S101: Yes in FIG. 9), the controller 130 transmits the contact information. In a first illustrative embodiment, an example will be described in which when the controller 130 transmits the contact information based on the discharge amount of the ink discharged through the head 21 when determining that the obtained liquid level signal is "H".

Figure 13:
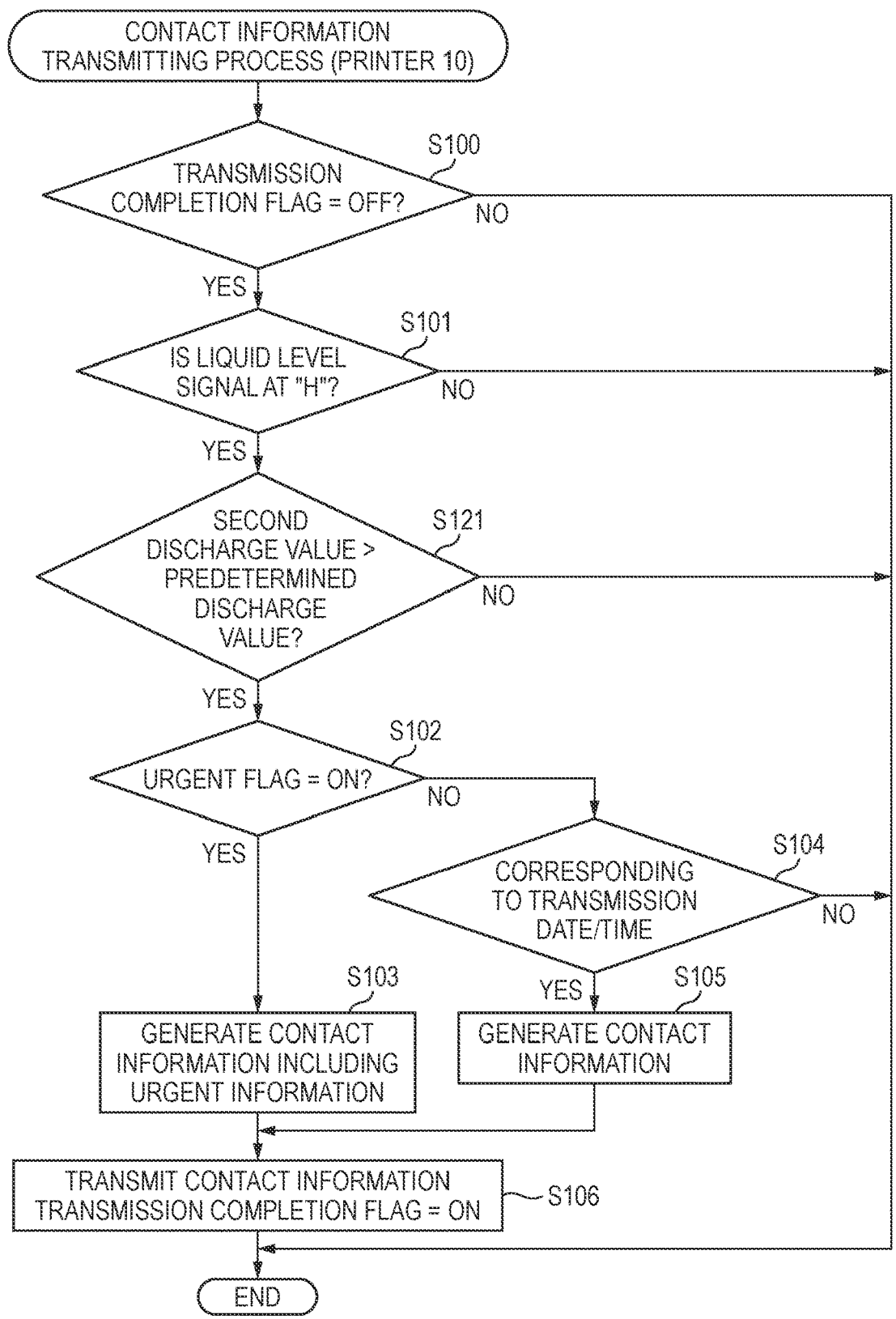
FIG. 13 is a flowchart of a contact information transmitting process according to a first modification.

In the first modification, the printer 10 executes a contact information transmitting process illustrated in FIG. 13 instead of the contact information transmitting process illustrated in FIG. 9. Processes other than processes illustrated in FIG. 13 are the same as the processes described in the first illustrative embodiment.

In the first modification, the printer 10 executes the contact information transmitting process illustrated in FIG. 13. Specifically, the controller 130 executes the contact information transmitting process illustrated in FIG. 13 when the date/time information output from the clock 30 becomes a predetermined time stored in the ROM 37 or the EEPROM 61. For example, the predetermined time is a time such as five minutes, ten minutes, or one hour. The controller 130 executes the contact information transmitting process at predetermined time intervals. The controller 130 may execute the contact information transmitting process at predetermined time intervals. For example, the controller 130 executes the contact information transmitting process when the time measured by the clock 30 reaches the predetermined time (for example, five minutes, ten minutes, or one hour).

The contact information transmitting process is a process in which the printer 10 transmits contact information to the information collection server 40. The contact information is the same as in the first illustrative embodiment. Details of the contact information transmitting process will be described with reference to FIG. 13. The same process as the contact information transmitting process (FIG. 9) described in the first illustrative embodiment is denoted by the same reference numeral as that in the first illustrative embodiment, and the description thereof will not be presented.

First, the controller 130 of the printer 10 determines whether the value of the transmission completion flag of the EEPROM 61 is "OFF" (S100). When determining that the value of the transmission completion flag of the EEPROM 61 is not "OFF", that is, "ON" (S100: No), the controller 130 ends the contact information transmitting process. When determining that the value of the transmission completion flag of the EEPROM 61 is "OFF" (S100: Yes), the controller 130 executes the process of step S101 as in the first illustrative embodiment. When determining that the obtained liquid level signal is not "H" (S101: No), the controller 130 ends the contact information transmitting process.

On the other hand, when determining that the obtained liquid signal is "H" (S101: Yes), the controller 130 executes a process of step S121. The process of step S121 is a process of determining whether the second discharge value is less than a predetermined discharge value. The second discharge value is a value of the amount of the ink discharged through the head 21 after the liquid level signal output from the liquid level sensor 33 is changed from "L" to "H."

Instead of determining whether the second discharge value is less than the predetermined discharge value, the controller 130 may determine whether the tank residual-amount value calculated in the fourth updating process (FIG. 8D) is equal to or more than a threshold. Since the tank residual-amount value is a value calculated using the second discharge value, the determination as to whether the tank residual-amount value is equal to or more than the threshold is synonymous with the determination as to whether the second discharge value is equal to or more than the predetermined value. Another determination equivalent to the determination whether the second discharge value is less than the predetermined discharge value is included in the determination whether the second discharge value is less than the predetermined discharge value.

The predetermined discharge value is set, for example, according to the liquid level of ink detected by the liquid level sensor 33 and is stored in advance in the ROM 37 or the EEPROM 61. For example, when the liquid level of the ink detected by the liquid level sensor 33 is located above the reference position P, the liquid level of the ink is detected by the liquid level sensor 33 before the ink stored in the liquid chamber 201 of the cartridge 200 is used up, that is, in a state a predetermined amount of ink remains in the cartridge 200. The predetermined discharge value is set to a value corresponding to the predetermined amount.

When determining that the second discharge value is not less than the predetermined discharge value (S121: No), the controller 130 ends the contact information transmitting process. On the other hand, when determining that the second discharge value is less than the predetermined discharge value (S121: Yes), the controller 130 executes the process from step S102 to step S106 as in the first illustrative embodiment and ends the contact information transmitting process. That is, the controller 130 generates contact information (S103 and S105) when the obtained liquid level signal is "H" and the second discharge value is less than the predetermined discharge value. Thereafter, the controller 130 transmits the contact information, and further stores "ON" in the transmission completion flag of the EEPROM 61 (S106).

The contact information transmitted from the printer 10 is received by the information collection server 40. Upon receiving the contact information, the information collection server 40 executes the order information transmitting process as in the first illustrative embodiment (FIG. 10A). In addition, the order information transmitted from the information collection server 40 by the order information transmitting process illustrated in FIG. 10A is received by the sending server 50 through the communication I/F 53, and the sending server 50 receiving the order information executes the sending information generating process (FIG. 10B) as in the first illustrative embodiment.

In the first modification, the controller 130 transmits the contact information according to the second discharge value, which is the discharge amount of the ink discharged through the head 21 after the liquid level signal output from the liquid level sensor 33 changes to "H. Therefore, it is possible to freely select a detection position of the liquid level sensor 33 of the printer 10 including the controller 130.

Further, the controller 130 transmits the contact information according to the second discharge value, which is the discharge amount of the ink discharged through the head 21 after the liquid level signal output from the liquid level sensor 33 changes to "H. Therefore, it is possible to freely change the timing at which the printer 10 transmits the contact information, by the change of the predetermined discharge value.

<Second Modification>

In the first illustrative embodiment described above, the description has been given about the example in which, when the controller 130 does not transmit the contact information after the cartridge 200 is installed (S100: Yes in FIG. 9) and determines that the obtained liquid level signal is "H" (S101: Yes in FIG. 9), the controller 130 transmits the contact information. In a second modification, an example will be described in which the controller 130 transmits contact information to the information collection server 40 even when the liquid level signal output from the liquid level sensor 33 does not change from "L" to "H" due to malfunction of the liquid level sensor 33 or the actuator 190.

Figure 14:
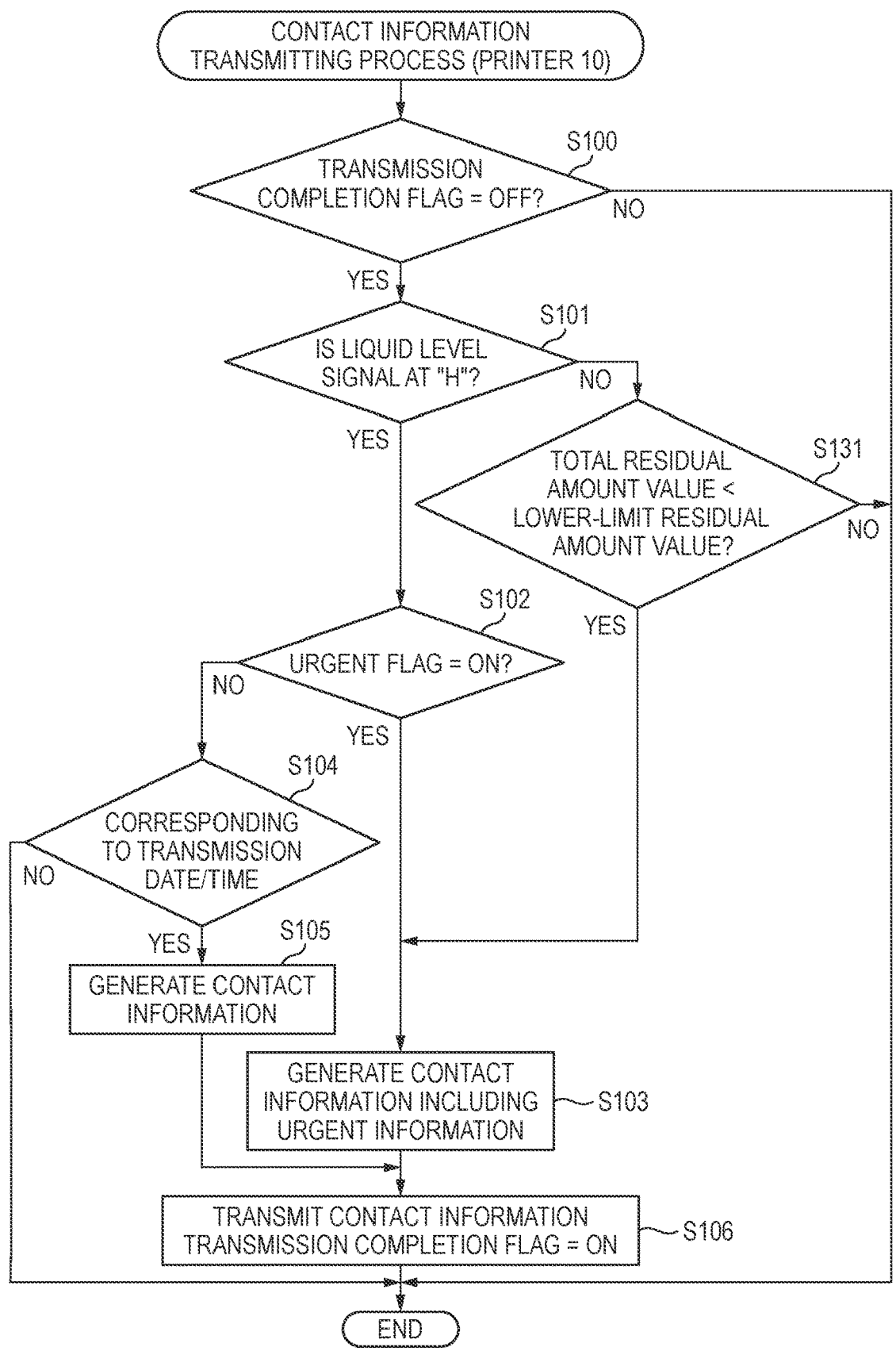
FIG. 14 is a flowchart of a contact information transmitting process according to a second modification.

In the second modification, the printer 10 executes a contact information transmitting process illustrated in FIG. 14 instead of the contact information transmitting process illustrated in FIG. 9. Processes other than processes illustrated in FIG. 14 are the same as the processes described in the first illustrative embodiment.

In the first modification, the printer 10 executes the contact information transmitting process illustrated in FIG. 14. Specifically, the controller 130 executes the contact information transmitting process illustrated in FIG. 14 when the date/time information output from the clock 30 becomes a predetermined time stored in the ROM 37 or the EEPROM 61. For example, the predetermined time is a time such as five minutes, ten minutes, or one hour. The controller 130 executes the contact information transmitting process at predetermined time intervals. The controller 130 may execute the contact information transmitting process at predetermined time intervals. For example, the controller 130 executes the contact information transmitting process when the time measured by the clock 30 reaches the predetermined time (for example, five minutes, ten minutes, or one hour).

The contact information transmitting process is a process in which the printer 10 transmits contact information to the information collection server 40. The contact information is the same as in the first illustrative embodiment. Details of the contact information transmitting process will be described with reference to FIG. 14. The same process as the contact information transmitting process (FIG. 9) described in the first illustrative embodiment is denoted by the same reference numeral as that in the first illustrative embodiment, and the description thereof will not be presented.

First, the controller 130 of the printer 10 determines whether the value of the transmission completion flag of the EEPROM 61 is "OFF" (S100). When determining that the value of the transmission completion flag of the EEPROM 61 is not "OFF", that is, "ON" (S100: No), the controller 130 ends the contact information transmitting process. When determining that the value of the transmission completion flag of the EEPROM 61 is "OFF" (S100: Yes), the controller 130 executes the process of step S101 as in the first illustrative embodiment. When determining that the obtained liquid level signal is not "H" (S101: No), the controller 130 executes the process from step S102 to step S106 and ends the contact information transmitting process as in the first illustrative embodiment.

On the other hand, when determining that the obtained liquid signal is not "H" (S101: No), the controller 130 executes a process of step S131. The process of step S131 is a process of determining whether the new total residual amount value calculated in step S43 of the second updating process (FIG. 8B) is less than a lower-limit residual amount value.

The lower-limit residual amount value is determined as follows. If the liquid level sensor 33 or the actuator 190 malfunctions, even when the liquid level position of the ink stored in the liquid chamber 171 of the tank 160 is lowered from a top of the reference position P to a bottom of the reference position P due to the execution of printing or maintenance, the liquid level signal output from the liquid level sensor 33 does not change from "L" to "H". Then, in the determination process of step S18 illustrated in FIG. 7, the controller 130 does not determine that the liquid level signal has changed from "L" to "H". In this case, the second updating process of step S19 is continuously executed. The lower-limit residual amount value is set as a value of the residual amount of ink stored in the liquid chamber 171 of the tank 160 when the position of the liquid level of the ink stored in the liquid chamber 171 of the tank 160 is lower than the reference position P by an amount corresponding to a detection error of the liquid level sensor 33 or an error of the first discharge value. That is, if the new total residual amount value calculated in the second updating process is less than the lower-limit residual amount value, there is a high probability that the liquid level sensor 33 or the actuator 190 malfunctions. The new total residual amount value calculated in the second updating process is an example of the residual amount including at least the amount of liquid in the second liquid chamber of the tank. The lower-limit residual amount value is an example of a predetermined residual amount.

Instead of determining whether the new total residual amount value calculated in step S43 is less than the lower-limit residual amount value, the controller 130 may determine whether the first discharge value is equal to or more than a predetermined value. The predetermined value is, for example, a value obtained by subtracting the lower-limit residual amount value from the total residual amount value which is the sum of an initial cartridge residual-amount value and an initial tank residual-amount value. Since the total residual amount value is a value calculated using the first discharge value, the determination as to whether the total residual amount value is less than the lower-limit residual amount value is synonymous with the determination as to whether the total residual amount value is less than the lower-limit residual amount value. Another determination equivalent to the determination whether the total residual amount value is less than the lower-limit residual amount value is included in the determination whether the total residual amount value is less than the lower-limit residual amount value.

When determining that the new total residual amount value calculated in step S43 is not less than the lower-limit residual amount value (S131: No), the controller 130 ends the contact information transmitting process. On the other hand, when determining that the new total residual amount value calculated in step S43 is less than the lower-limit residual amount value (S131: Yes), the controller 130 generates contact information including urgent contact information (S103). The controller 130 transmits the generated contact information to the information collection server 40 through the communication I/F 31, and further stores "ON" in the transmission completion flag of the EEPROM 61 (S106), thereby ending the contact information transmitting process.

The contact information transmitted from the printer 10 is received by the information collection server 40. The information collection server 40 which has received the contact information executes the same order information transmitting process (FIG. 10A) as that of the first illustrative embodiment. The sending server 50, which has received through the communication I/F 53 the order information transmitted from the information collection server 40 through the order information transmitting process illustrated in FIG. 10A, executes the same sending information generating process (FIG. 10B) as that of the first illustrative embodiment.

In the second modification, for example, even when the liquid level sensor 33 or the actuator 190 breaks down, the contact information is transmitted to the information collection server 40. Accordingly, there is a high possibility that a new cartridge 200 is delivered to the destination of a user before the ink stored in the liquid chamber 171 of the tank 160 is used up. As a result, it is possible to reduce the concern that the ink stored in the liquid chamber 171 of the tank 160 is used up and the printing cannot be continued.

Further, in the second modification, when determining that the total residual amount value is less than the lower-limit residual amount value (S131: Yes), the controller 130 generates the contact information including the urgent information and transmits the generated contact information to the information collection server 40. Accordingly, compared to the case of transmitting contact information not including the urgent information to the information collection server 40, a new cartridge 200 is delivered to the destination of the user earlier. As a result, it is possible to further reduce the concern that the ink stored in the liquid chamber 171 of the tank 160 is used up and the printing cannot be continued.

In addition, when determining that the total residual amount value is less than the lower-limit residual amount value (S131: Yes), the controller 130 may generate contact information not including the urgent information.

<Third Modification>

The printer 10 described above in the second illustrative embodiment may include the liquid level sensor 33 as in the first illustrative embodiment.

Figure 15:
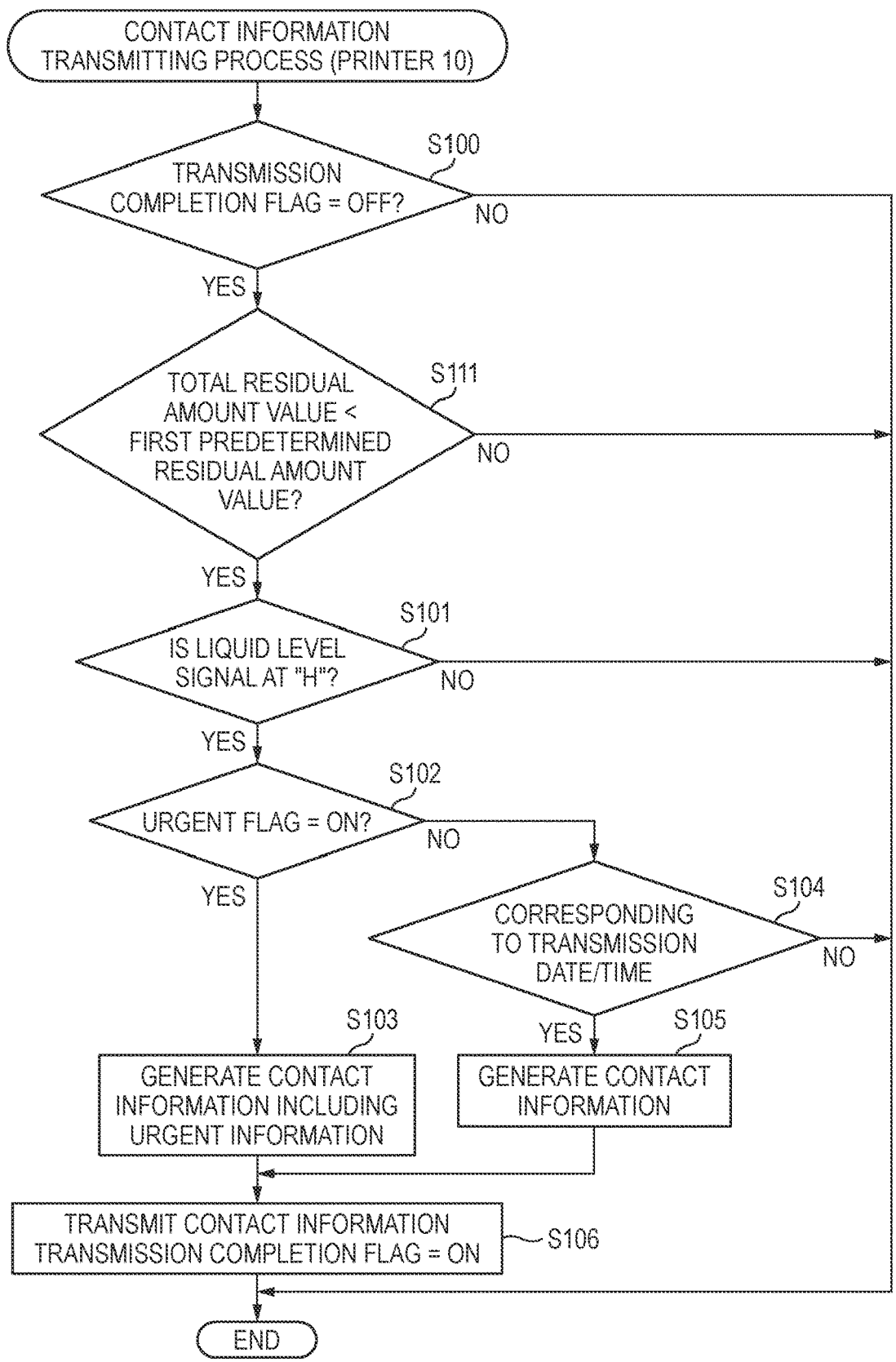
FIG. 15 is a flowchart of a contact information transmitting process according to a third modification.

In a third modification, the printer 10 executes a contact information transmitting process illustrated in FIG. 15 instead of the contact information transmitting process illustrated in FIG. 12. The processes other than the processes illustrated in FIG. 15 are the same as those described in the first illustrative embodiment and the second illustrative embodiment. The same processes as those of the first illustrative embodiment and the second illustrative embodiment are denoted by the same reference numerals thereof, and description thereof will not be presented.

First, the controller 130 of the printer 10 determines whether the value of the transmission completion flag of the EEPROM 61 is "OFF" (S100). When determining that the value of the transmission completion flag of the EEPROM 61 is not "OFF", that is, the value is "ON" (S100: No), the controller 130 ends the contact information transmitting process. When determining that the value of the transmission completion flag of the EEPROM 61 is "OFF" (S100: Yes), the controller 130 executes the process of step S111 as in the second illustrative embodiment. When a new total residual amount value calculated in the fifth updating process (FIGS. 11B1 and 11B2) is not less than a first predetermined residual amount value (S111: No), the controller 130 ends the contact information transmitting process.

On the other hand, when the new total residual amount value calculated in the fifth updating process is less than the first predetermined residual amount value (S111: Yes), the controller 130 executes the processes from step S101 to S106 as in the first illustrative embodiment.

The contact information transmitted from the printer 10 is received by the information collection server 40. The information collection server 40 which has received the contact information executes the same order information transmitting process (FIG. 10A) as that of the first illustrative embodiment. The order information transmitted from the information collection server 40 through the order information transmitting process illustrated in FIG. 10A is received by the sending server 50 through the communication I/F 53.

The sending server 50 which has received the order information executes the same sending information generating process (FIG. 10B) as in the first illustrative embodiment.

In this modification, the controller 130 transmits the contact information to the information collection server 40 regardless of the error of the calculated total residual amount value. Therefore, the concern is further reduced that the ink stored in the liquid chamber 171 of the tank 160 is used up and the printing cannot be continued before a new cartridge 200 is delivered to the destination of the user.

<Other Modifications>

In the above-described first illustrative embodiment, the example is described in which the elapsed time until the liquid level signal output from the liquid level sensor 33 changes from "L" to "H" is calculated in step S55 (FIG. 8D) since the cartridge 200 is installed. In the second illustrative embodiment, the example is described in which the elapsed time from when the cartridge 200 is installed until the total residual amount value becomes less than the first predetermined residual amount value is calculated in step S55 (FIGS. 11B1 and 11B2). However, the time from when the total residual amount value calculated in the second updating process or the fifth updating process becomes a first predetermined value (for example, same as the first predetermined residual amount value) stored in the ROM 37 or the EEPROM 61 until the total residual amount value becomes a second predetermined value, (which is larger than the second predetermined residual amount value) which is smaller than the first predetermined value, may be calculated as the elapsed time. That is, it may be determined whether the discharge rate of the ink stored in the liquid chamber 210 of the cartridge 200 is fast depending on the elapsed time of the residual amount of the ink stored in the liquid chamber 210 of the cartridge 200 changing from the residual amount indicated by the first predetermined value to the residual amount indicated by the second predetermined value. The date/time information is an example of a predetermined time point when the total residual amount value becomes the first predetermined value.

In the above description, the time when the cartridge 200 is installed in the installation case 150 is described as an example of the predetermined time which is a starting point of calculating the elapsed time. However, as the predetermined time which is the starting point of calculating the elapsed time, various times can be set such as the time when the ink is discharged through the head 21 for the first time, the time when printing is executed for the first time, and the like, since the cartridge 200 is installed in the installation case 150.

In the above description, the example is described in which it is determined whether to store "ON" in the urgent flag (S56) based on the calculated elapsed time. However, based on the calculated elapsed time, it may be determined whether to transmit the contact information promptly or later. Specifically, the controller 130 of the printer 10 determines whether the elapsed time is less than the first time. In this case, the first time is an example of the predetermined time.

When determining that the elapsed time is less than the first time, the controller 130 transmits the contact information promptly (S106) after the determining process of step S101 (S101: Yes) or after the determining process of step S111 (S111: Yes). Transmitting the contact information promptly means that, for example, transmitting is performed without waiting for the date/time information output by the clock 30 corresponding to an appointed time. On the other hand, not transmitting the contact information promptly means that, for example, the contact information is transmitted waiting for the date/time information output by the clock 30 corresponding to an appointed time. That is, when the discharge rate of the ink stored in the liquid chamber 210 of the cartridge 200 is slow, the contact information is transmitted at an appointed time every day or every week, and when the discharge rate of the ink stored in the liquid chamber 210 of the cartridge 200 is fast, the contact information is transmitted without waiting for an appointed time every day or every week. When the discharge rate of the ink stored in the liquid chamber 210 of the cartridge 200 is fast, since the contact information is transmitted promptly, the concern is further reduced that the ink stored in the liquid chamber 171 of the tank 160 is used up and the printing cannot be continued before a new cartridge 200 is delivered to the destination of the user.

In the above description, the example is described in which the printer 10 transmits contact information, and the information collection server 40 that has received the contact information transmits order information to the sending server 50 through the communication I/F 44. However, each process executed by the controller 45 of the information collection server 40 may be executed by the controller 130 of the printer 10. In other words, the printer 10 transmits order information to the sending server 50 through the communication I/F 31 instead of transmitting the contact information. In this case, the printer 10 is an example of a liquid discharging system, and the printer 10 and the sending server 50 are an example of a delivery system. The controller 130 of the printer 10 is an example of a controller system.

In the above description, the example is described in which the ink flows out of the cartridge 200 to the tank 160 due to the water head difference. However, the ink may flow out of the cartridge 200 to the tank 160 using gravity, a pump, or the like. That is, the disclosure can also be used for a printer that supplies ink from the cartridge 200 to the tank 160 using gravity or a driving source.

In the illustrative embodiment described above, the controller 130 detects, based on the signal output from the liquid level sensor 33, whether the detection target portion 194 of the actuator 190 is in the first state or the second state. However, the configuration of the liquid level sensor 33 is not particularly limited as long as the liquid level of the ink in the liquid chamber 171 can be detected. For example, the liquid level sensor 33 may be a sensor for optically detecting the liquid level of the ink in the liquid chamber 171 using a prism having a different reflectance depending on whether the ink is in contact with the rear wall 164 of the liquid chamber 171. Further, the liquid level sensor 33 may be an electrode bar inserted into the liquid chamber 171.

Furthermore, in the illustrative embodiment described above, the ink is an example of liquid. However, the liquid may be pretreatment liquid discharged to a paper and the like prior to ink at the time of printing, or may be water for cleaning the head 21.

As discussed above, the disclosure may provide at least the following illustrative, non-limiting embodiments.

(1) A liquid consuming system, comprising: an installation case configured to receive a cartridge, the cartridge comprising a first liquid chamber storing a liquid; a tank comprising a second liquid chamber; a flow path configured to communicate with the second liquid chamber and the first liquid chamber of the cartridge installed in the installation case; a head communicated with the second liquid chamber; a first communication interface; and a controller system configured to: determine a residual amount including at least an amount of liquid in the second liquid chamber of the tank; determine whether the determined residual amount reaches a predetermined amount; and based on determining that the determined residual amount reaches the predetermined amount, transmit first information through the first communication interface, the first information indicating an order instruction of the cartridge.

(2) The liquid consuming system of (1), wherein the controller system is configured to: measure an elapsed time until determining that the residual amount reaches the predetermined amount from a predetermined time point; determine whether the elapsed time reaches a first time; and based on determining that the elapsed time does not reach the first time, transmit the first information and second information through the first communication interface, the second information indicating that a consumption rate of the liquid is fast.

(3) The liquid consuming system of (1), wherein the controller system is configured to: measure an elapsed time until determining that the residual amount reaches the predetermined amount from a predetermined time point; determine whether the elapsed time reaches a first time; and based on determining that the elapsed time does not reach the first time, transmit the first information and second information through the first communication interface, the second information indicating a delivery speed of the cartridge.

(4) The liquid consuming system of any one of (1) to (3), wherein the controller system is configured to: measure an elapsed time which is a time until determining that the residual amount reaches the predetermined amount from a predetermined time point; determine whether the elapsed time reaches a predetermined time; and based on determining that the elapsed time does not reach the predetermined time, transmit the first information through the first communication interface.

(5) The liquid consuming system according to any one of (1) to (4), further comprising: a liquid level sensor, wherein the controller system is configured to: receive, from the liquid level sensor a first signal in a case a position of a liquid level in the second liquid chamber is equal to or higher than a predetermined position, the predetermined position corresponding to an amount of liquid contained at least in the second liquid chamber smaller than the predetermined amount; and receive, from the liquid level sensor, a second signal in a case the position of the liquid level in the second liquid chamber being lower than the predetermined position.

(6) The liquid consuming system of (5), wherein the controller system is configured to, based on determining that the determined residual amount does not reach the predetermined amount and receiving the second signal, transmit the first information.

(7) The liquid consuming system of (5) or (6), wherein the tank comprises a detection object, the detection object being in a first state in the case the position of the liquid level in the second liquid chamber is equal to or higher than the predetermined position, the detection object being in a second state in the case the position of the liquid level in the second liquid chamber is lower than the predetermined position, the second state being different from the first state, and wherein the liquid level sensor is configured to: based on detecting the detection object being in the first state, output the first signal; and based on detecting the detection object being in the second state, output the second signal.

(8) The liquid consuming system of any one of (5) to (7), wherein the first liquid chamber of the cartridge installed in the installation case communicates with the outside, wherein the second liquid chamber of the tank communicates with the outside, wherein a part of the second liquid chamber is located below the first liquid chamber of the cartridge installed in the installation case, and wherein the predetermined position is located below the first liquid chamber of the cartridge installed in the installation case.

(9) The liquid consuming system of any one of (1) to (7), wherein the first liquid chamber of the cartridge installed in the installation case communicates with the outside, wherein the second liquid chamber of the tank communicates with the outside, and wherein the second liquid chamber is partially located below the first liquid chamber of the cartridge installed in the installation case.

(10) The liquid consuming system of any one of (1) to (9), further comprising: an alarm, wherein the controller system is configured to, based on determining that the residual amount reaches the predetermined amount, operate the alarm.

(11) The liquid consuming system of any one of (1) to (10), comprising: a liquid consuming device comprising the installation case, the tank, the head, a first controller, and a second communication interface; and an information processing device comprising the first communication interface and a second controller, wherein the controller system comprises the first controller and the second controller, wherein the first controller is configured to: determine whether the residual amount including at least the amount of liquid stored in the second liquid chamber of the tank reaches the predetermined amount; and based on determining that the residual amount reaches the predetermined amount, transmit information to the information processing device through the second communication interface, the information indicating that the residual amount reaches the predetermined amount, and wherein the second controller is configured to: receive the information through the first communication interface; and based on receiving the information, transmit the first information through the first communication interface.

(12) A liquid consuming system, comprising: an installation case configured to receive a cartridge, the cartridge comprising a first liquid chamber storing a liquid; a tank comprising a second liquid chamber; a flow path configured to communicate with the second liquid chamber and the first liquid chamber of the cartridge installed in the installation case; a head communicated with the second liquid chamber; a liquid level sensor; a first communication interface; and a controller system configured to: in a case a position of a liquid level in the second liquid chamber is equal to or higher than a predetermined position, receive, from the liquid level sensor, a first signal; in a case the position of the liquid level in the second liquid chamber is lower than the predetermined position, receive, from the liquid level sensor, a second signal; and based on receiving the second signal from the liquid level sensor after receiving the first signal, transmit first information indicating an order instruction of the cartridge through the first communication interface.

(13) The liquid consuming system of (12), wherein the controller system is configured to: after receiving the second signal from the liquid level sensor, receive a discharge instruction to discharge a liquid through the head; based on receiving the discharge instruction, discharge the liquid through the head; based on receiving the discharge instruction, count a discharge amount of the liquid instructed by the discharge instruction; determine whether the counted discharge amount of liquid reaches a predetermined discharge amount; and based on determining that the counted discharge amount of liquid reaches the predetermined discharge amount, transmit the first information through the first communication interface.

(14) The liquid consuming system of (12), wherein the controller system is configured to, based on receiving the second signal from the liquid level sensor after receiving the first signal, transmit the first information through the first communication interface.

(15) The liquid consuming system of (13) or (14), wherein the controller system is configured to: determine a residual amount including at least an amount of liquid stored in the second liquid chamber of the tank; determine whether the determined residual amount reaches a predetermined residual amount, the predetermined residual amount being smaller than an amount of liquid when the position of the liquid level in the second liquid chamber is at the predetermined position; and based on receiving the first signal and determining that the determined residual amount reaches the predetermined residual amount, transmit the first information through the first communication interface.

(16) The liquid consuming system of (12) to (15), wherein the controller system is configured to: determine a residual amount including at least the amount of liquid stored in the second liquid chamber of the tank; measure an elapsed time until determining that the residual amount reaches the predetermined amount from a predetermined time point; determine whether the elapsed time reaches a first time; and based on determining that the elapsed time does not reach the first time, transmit the first information and second information through the first communication interface, the second information indicating that a consumption rate of the liquid is fast.

(17) The liquid consuming system of (12) to (15), wherein the controller system is configured to: determine a residual amount including at least the amount of liquid stored in the second liquid chamber of the tank; measure an elapsed time until determining that the residual amount reaches the predetermined amount from a predetermined time point; determine whether the elapsed time reaches a first time; and based on determining that the elapsed time does not reach the first time, transmit the first information and second information through the first communication interface, the second information indicating a delivery speed of the cartridge.

(18) The liquid consuming system of (12) to (15), wherein the controller system is configured to: measure an elapsed time until receiving the second signal from a predetermined time point; determine whether the elapsed time reaches a predetermined time; and based on determining that the elapsed time does not reach the predetermined time, transmit the first information through the first communication interface.

(19) The liquid consuming system of (12) to (18), further comprising: an alarm, wherein based on receiving the second signal after receiving the first signal, the controller system is configured to operate the alarm.

(20) The liquid consuming system of (12) to (19), wherein the tank comprises a detection object, the detection object being in a first state in the case the position of the liquid level in the second liquid chamber is equal to or higher than the predetermined position, the detection object being in a second state in the case the position of the liquid level in the second liquid chamber is lower than the predetermined position, the second state being different from the first state, and wherein the liquid level sensor is configured to: based on detecting the detection object being in the first state, output the first signal; and based on detecting the detection object being in the second state, output the second signal.

(21) The liquid consuming system of (12) to (20), wherein the first liquid chamber of the cartridge installed in the installation case communicates with the outside, wherein the second liquid chamber of the tank communicates with the outside, wherein a part of the second liquid chamber is located below the first liquid chamber of the cartridge installed in the installation case, and wherein the predetermined position is located below the first liquid chamber of the cartridge installed in the installation case.

(22) The liquid consuming system of (12) to (21), comprising: a liquid consuming device comprising the installation case, the tank, the head, a first controller, and a second communication interface; and an information processing device comprising the first communication interface and a second controller, wherein the controller system comprises the first controller and the second controller, wherein the first controller is configured to: determine whether the second signal is received after receiving the first signal; and based on determining that the second signal is received after receiving the first signal, transmit information through the second communication interface, the information indicating that the second signal is received after the first signal is received, and wherein the second controller is configured to: receive the information through the first communication interface; and based on receiving the information, transmit the first information through the first communication interface.

(23) The liquid consuming system of (1) to (22), comprising the cartridge.

(24) A delivery system comprising: the liquid consuming system according to any one of (1) to (23); and a server comprising a controller and a communication interface, wherein the controller of the server is configured to: receive the first information transmitted from the liquid consuming system through the communication interface of the server; and create information on delivery arrangement of the cartridge when receiving the first information.

According to the disclosure, it is possible to determine the date of ordering the cartridge based on information including the residual amount of liquid in the cartridge.

What is claimed is:

1. A liquid consuming system, comprising:
   an installation case configured to receive a cartridge, the cartridge comprising a first liquid chamber storing a liquid;
   a tank comprising a second liquid chamber;
   a flow path configured to communicate with the second liquid chamber and the first liquid chamber of the cartridge installed in the installation case;
   a head communicated with the second liquid chamber;
   a first communication interface configured to communicate with an outside of the liquid consuming system;
   a liquid level sensor that is configured to detect a position of a liquid level in the first liquid chamber and a position of a liquid level in the second liquid chamber; and
   a controller system configured to:
      receive, from the liquid level sensor, a first signal in a case the position of the liquid level in the first liquid chamber and the position of the liquid level in the second liquid chamber are equal to or higher than a predetermined position, the predetermined position corresponding to an amount of liquid contained at least in the second liquid chamber smaller than a predetermined amount;
      receive, from the liquid level sensor, a second signal in a case the position of the liquid level in the first liquid chamber and the position of the liquid level in the second liquid chamber are lower than the predetermined position;
      determine a residual amount including at least an amount of liquid in the second liquid chamber of the tank; and
      based on the received second signal, determine whether the liquid stored in the first liquid chamber has run out and the determined residual amount reaches the predetermined amount; and
      based on determining that the liquid stored in the first liquid chamber has run out and the determined residual amount reaches the predetermined amount, automatically transmit an order instruction of another cartridge through the first communication interface,
   wherein the order instruction includes identification information of the liquid consuming system.

2. The liquid consuming system according to claim 1, wherein the controller system is configured to:
   measure an elapsed time until determining that the residual amount reaches the predetermined amount from a predetermined time point;
   determine whether the elapsed time reaches a first time; and.
   based on determining that the elapsed time does not reach the first time, transmit first information and second information through the first communication interface, the first information corresponding to the order instruction and the second information indicating that a. consumption rate of the liquid is fast.

3. The liquid consuming system according to claim 1, wherein the controller system is configured to:
   measure an elapsed time until determining that the residual amountreaches the predetermined amount from a predetermined time point;
   determine whether the elapsed time reaches a first time; and
   based on determining that the elapsed time does not reach the first time, transmit first information and second information through the first communication interface, the first information corresponding to the order instruction and the second information indicating a delivery speed of the cartridge.

4. The liquid consuming system according to claim 1, wherein the controller system is configured to:
   measure an elapsed time which is a time until determining that the residual amount reaches the predetermined amount from a. predetermined time point;
   determine whether the elapsed time reaches a predetermined time; and
   based on determining that the elapsed time does not reach the predetermined time, transmit first information through the first communication interface, the first information corresponding to the order instruction.

5. The liquid consuming system according to claim 1, wherein the controller system is configured to, based on determining that the determined residual amount does not reach the predetermined amount and receiving the second signal, transmit the order instruction.

6. The liquid consuming system according to claim 1, wherein the tank comprises a detection object, the detection object being in a first state in the case the position of the liquid level in the second liquid chamber is equal to or higher than the predetermined position, the detection object being in a second state in the case the position of the liquid level in the second liquid chamber is lower than the predetermined position, the second state being different from the first state, and
wherein the liquid level sensor is configured to:
based on detecting the detection object being in the first state, output the first signal; and
based on detecting the detection object being in the second state, output the second signal.

7. The liquid consuming system according to claim 1, wherein the first liquid chamber of the cartridge installed in the installation case communicates with the outside,
wherein the second liquid chamber of the tank communicates with the outside,
wherein a part of the second liquid chamber is located below the first liquid chamber of the cartridge installed in the installation case, and
wherein the predetermined position is located below the first liquid chamber of the cartridge installed in the installation case.

8. The liquid consuming system according to claim 1, wherein the first liquid chamber of the cartridge installed in the installation case communicates with the outside,
wherein the second liquid chamber of the tank communicates with the outside, and
wherein the second liquid chamber is partially located below the first liquid chamber of the cartridge installed in the installation case.

9. The liquid consuming system according to claim 1, further comprising:
an alarm,
wherein the controller system is configured to, based on determining that the residual amount reaches the predetermined amount, operate the alarm.

10. The liquid consuming system according to claim 1, comprising:
a liquid consuming device comprising the installation case, the tank, the head, a first controller, and a second communication interface; and.
an information processing device comprising the first communication interface and a second controller,
wherein the controller system comprises the first controller and the second controller,
wherein the first controller is configured to:
determine whether the residual amount including at least the amount of liquid stored in the second liquid chamber of the tank reaches the predetermined amount; and
based on determining that the residual amount reaches the predetermined amount, transmit information to the information processing device through the second communication interface, the information indicating that the residual amount reaches the predetermined amount, and
wherein the second controller is configured to:
receive the information through the first communication interface; and
based on receiving the information, transmit the order instruction through the first communication interface.

11. The liquid consuming system according to claim 1, comprising the cartridge.

12. A delivery system comprising:
the liquid consuming system according to claim 1; and
a server comprising a controller and a communication interface,
wherein the controller of the server is configured to:
receive the order instruction transmitted from the liquid consuming system through the communication interface of the server; and
create information on delivery arrangement of the cartridge when receiving the order instruction.

13. The liquid consuming system according to claim 1, wherein the identification information of the liquid consuming system includes a MAC address of the liquid. consuming system.

14. The liquid consuming system according to claim 1, wherein the identification information of the liquid consuming system includes a serial number of the liquid consuming system.

15. The liquid consuming system according to claim 1, wherein the order instruction further includes type information of the cartridge received in the installation case.

16. The liquid consuming system according to claim 15, wherein the type information included in the order instruction indicates a color of ink stored in the cartridge received in the installation case.

17. A liquid consuming system, comprising:
an installation case configured to receive a cartridge, the cartridge comprising a first liquid chamber storing a liquid;
a tank comprising a second liquid chamber;
a flow path configured to communicate with the second liquid chamber and the first liquid chamber of the cartridge installed in the installation case;
a head communicated with the second liquid chamber;
a liquid level sensor that is configured to detect a position of a liquid level in the first liquid chamber and a position of a liquid level in the second liquid chamber;
a first communication interface configured to communicate with an outside of the liquid consuming system; and
a controller system configured to:
in a case the position of the liquid level in the first liquid chamber and the position of the liquid level in the second liquid chamber are equal to or higher than a predetermined position, receive, from the liquid level sensor, a first signal;
in a case the position of the liquid level in the first liquid chamber and the position of the liquid level in the second liquid chamber are lower than the predetermined position, receive, from the liquid level sensor, a second signal indicating that the liquid stored in the first liquid chamber has run out; and
based on receiving the second signal from the liquid level sensor after receiving the first signal, automatically transmit an order instruction of another cartridge through the first communication interface,
wherein the order instruction includes identification information of the liquid consuming system.

18. The liquid consuming system according to claim 17, wherein the controller system is configured to:
after receiving the second signal from the liquid level sensor, receive a discharge instruction to discharge a liquid through the head;
based on receiving the discharge instruction, discharge the liquid through the head;
based on receiving the discharge instruction, count a discharge amount of the liquid instructed by the discharge instruction;
determine whether the counted discharge amount of liquid reaches a predetermined discharge amount; and
based on determining that the counted discharge amount of liquid reaches the predetermined discharge amount, transmit first information through the first communication interface, the first information corresponding to the order instruction.

19. The liquid consuming system according to claim 18, wherein the controller system is configured to:
determine a residual amount including at least an amount of liquid stored in the second liquid chamber of the tank;
determine whether the determined residual amount reaches a predetermined residual amount, the predetermined residual amount being smaller than an amount of liquid when the position of the liquid level in the second liquid chamber is at the predetermined position; and
based on receiving the first signal and determining that the determined residual amount reaches the predetermined residual amount, transmit the first information through the first communication interface.

20. The liquid consuming system according to claim 17, wherein the controller system is configured to, based on receiving the second signal from the liquid level sensor after receiving the first signal, transmit first information through the first communication interface, the first information corresponding to the order instruction.

21. The liquid consuming system according to claim 20, wherein the controller system is configured to:
determine a residual amount including at least an amount of liquid stored in the second liquid chamber of the tank;
determine whether the determined residual amount reaches a predetermined residual amount, the predetermined residual amount being smaller than an amount of liquid when the position of the liquid level in the second liquid chamber is at the predetermined position; and
based on receiving the first signal and determining that the determined residual amount reaches the predetermined residual amount, transmit the first information through the first communication interface.

22. The liquid consuming system according to claim 17, wherein the controller system is configured to:
determine a residual amount including at least the amount of liquid stored in the second liquid chamber of the tank;
measure an elapsed time until determining that the residual amount reaches the predetermined amount from a predetermined time point;
determine whether the elapsed time reaches a first time; and
based on determining that the elapsed time does not reach the first time, transmit first information and second information through the first communication interface, the first information corresponding to the order instruction and the second information indicating that a consumption rate of the liquid is fast.

23. The liquid consuming system according to claim 17, wherein the controller system is configured to:
determine a residual amount including at least the amount of liquid stored in the second liquid chamber of the tank;
measure an elapsed time until determining that the residual amount reaches the predetermined amount from a predetermined time point;
determine whether the elapsed time reaches a first time; and
based on determining that the elapsed time does not reach the first time, transmit first information and second information through the first communication interface, the first information corresponding to the order instruction and the second information indicating a delivery speed of the cartridge.

24. The liquid consuming system according to claim 17, wherein the controller system is configured to:
measure an elapsed time until receiving the second signal from a predetermined time point;
determine whether the elapsed time reaches a predetermined time; and
based on determining that the elapsed time does not reach the predetermined time, transmit the order instruction through the first communication interface.

25. The liquid consuming system according to claim 17, further comprising:
an alarm,
wherein based on receiving the second signal after receiving the first signal, the controller system is configured to operate the alarm.

26. The liquid consuming system according to claim 17, wherein the tank comprises a detection object, the detection object being in a first state in the case the position of the liquid level in the second liquid chamber is equal to or higher than the predetermined position, the detection object being in a second state in the case the position of the liquid level in the second liquid chamber is lower than the predetermined position, the second state being different from the first state, and
wherein the liquid level sensor is configured to:
based on detecting the detection object being in the first state, output the first signal; and
based on detecting the detection object, being in the second state, output the second signal.

27. The liquid consuming system according to claim 17, wherein the first liquid chamber of the cartridge installed in the installation case communicates with the outside,
wherein the second liquid chamber of the tank communicates with the outside,
wherein a part of the second liquid chamber is located below the first liquid chamber of the cartridge installed in the installation case, and
wherein the predetermined position is located below the first liquid chamber of the cartridge installed in the installation case.

28. The liquid consuming system according to claim 17, comprising
a liquid consuming device comprising the installation case, the tank, the head, a first controller, and a second communication interface; and
an information processing device comprising the first communication interface and a second controller,
wherein the controller system comprises the first controller and the second controller,
wherein the first controller is configured to:
determine whether the second signal is received after receiving the first signal; and
based on determining that the second signal is received after receiving the first signal, transmit information through the second communication interface, the information indicating that the second signal is received after the first signal is received, and wherein the second controller is configured to:
receive the information through the first communication interface; and
based on receiving the information, transmit the order instruction through the first communication interface.

29. The liquid consuming system according to claim 17, comprising the cartridge.

30. A delivery system comprising:
the liquid consuming system according to claim 17; and
a server comprising a controller and a communication interface,
wherein the controller of the server is configured to:
receive the order instruction transmitted from the liquid consuming system through the communication interface of the server; and
create information on delivery arrangement of the cartridge when receiving the order instruction.

31. The liquid consuming system according to claim 17, wherein the identification information of the liquid consuming system includes a MAC address of the liquid. consuming system.

32. The liquid consuming system according to claim 17, wherein the identification information of the liquid consuming system includes a serial number of the liquid consuming system.

33. The liquid consuming system according to claim 17, wherein the order instruction further includes type information of the cartridge received in the installation case.

34. The liquid consuming system according to claim 33, wherein the type information included in the order instruction indicates a color of ink stored in the cartridge received in the installation case.

* * * * *

UNITED STATES PATENT AND TRADEMARK OFFICE
CERTIFICATE OF CORRECTION

PATENT NO. : 11,192,384 B2
APPLICATION NO. : 16/226996
DATED : December 7, 2021
INVENTOR(S) : Kenta Horade et al.

Page 1 of 1

It is certified that error appears in the above-identified patent and that said Letters Patent is hereby corrected as shown below:

In the Claims

Column 40, Claim 3, Line 35: Delete "amountreaches" and insert --amount reaches-- therefor.

Column 40, Claim 4, Line 49: Delete "from a." and insert --from a-- therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*